(12) United States Patent
Crabtree et al.

(10) Patent No.: US 6,263,088 B1
(45) Date of Patent: Jul. 17, 2001

(54) SYSTEM AND METHOD FOR TRACKING MOVEMENT OF OBJECTS IN A SCENE

(75) Inventors: Ralph N. Crabtree, Atlanta; Michael C. Moed; Mehdi Khosravi, both of Roswell, all of GA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/020,323

(22) Filed: Feb. 6, 1998

Related U.S. Application Data

(60) Provisional application No. 60/050,972, filed on Jun. 19, 1997.

(51) Int. Cl.[7] .............................. G06K 9/00; G06K 9/62; H04N 5/225; H04N 9/64

(52) U.S. Cl. ..................... 382/103; 382/104; 382/107; 382/225; 348/169; 348/700

(58) Field of Search .................................... 382/103, 107, 382/173, 236, 104, 226, 225; 348/699, 700, 169

(56) References Cited

U.S. PATENT DOCUMENTS

| | | | |
|---|---|---|---|
| 5,280,530 | * | 1/1994 | Trew et al. ............................ 382/103 |
| 5,285,273 | * | 2/1994 | James et al. .......................... 382/103 |
| 5,323,470 | * | 6/1994 | Kara et al. ............................ 382/103 |
| 5,341,142 | | 8/1994 | Reis et al. ............................ 342/64 |
| 5,434,927 | * | 7/1995 | Brady et al. .......................... 382/104 |
| 5,537,118 | * | 7/1996 | Appriou ................................. 342/95 |
| 5,761,326 | * | 6/1998 | Brady et al. .......................... 382/103 |
| 5,809,161 | | 9/1998 | Auty et al. ........................... 382/104 |
| 5,870,502 | | 2/1999 | Bonneau et al. ...................... 382/249 |
| 5,883,969 | * | 3/1999 | Le Gouzouguec et al. ......... 382/103 |
| 5,923,365 | * | 7/1999 | Tamir et al. .......................... 382/103 |
| 5,947,413 | * | 9/1999 | Mahalanobis ........................ 382/103 |
| 6,035,067 | * | 3/2000 | Ponticos ................................ 382/226 |

OTHER PUBLICATIONS

Cai, et al "Automatic Tracking of Human Motion in Door Scenes Across Multiple Synchronized Video Streams", pp. 356–362, IEEE, Jan. 1998.*

Munno, et al "Automatic Video Image Moving Target Detection for Wide Area Surveillance", pp. 47–57, IEEE, 1993.*

Lane, et al "Robust Tracking of Multiple in Sector–Scan Sonar Image Sequences Using Optical Flow Motion Estimation", pp. 31–46, vol. 23, No. 1, Jan. 1998.*

"Deformable Contours: Modeling, Extraction, Detection and Classification" by Kok Fung Lai, 1994.

"Vision Tutor" Version 1.1 Lecture Guide Ch. 5–6, from Amerinex Artificial Intelligence, Inc. 1995, pp. 5–1—6–90.

(List continued on next page.)

Primary Examiner—Phuoc Tran
Assistant Examiner—Daniel G. Mariam
(74) Attorney, Agent, or Firm—Needle & Rosenberg, P.C.

(57) ABSTRACT

A system and method for tracking movement of objects, such as people, through a scene. A background image comprising image information representing a background of the scene is generated. Image information for a video frame is compared with image information of the background image to generate regions in a video frame which potentially represent objects to be tracked in the scene. Region clusters are formed by combinations of regions if such combination satisfy predetermined criteria, and the region clusters are hypotheses of objects to be tracked. Each region cluster is evaluated to determine whether each represents an object to be tracked, based on object model information and correspondence to region clusters in a prior video frame. A confidence value is generated for each region cluster that represents a likelihood that the region represents an object to be tracked. A correspondence is determined between region clusters in consecutive video frames. Tracks of objects through the scene over time are constructed based upon the correspondence determined between region clusters in consecutive video frames.

16 Claims, 20 Drawing Sheets

OTHER PUBLICATIONS

"Reduction of color space dimensionality by moment–preserving thresholding and its application for edge detection in color images" by Chen–Kuei Yang et al., in Pattern Recognition Letters, 1996, pp. 481–490.

"Automatic Feature Point Extraction and Tracking in Image Sequences for Unknown Camera Motion" by Qinfen Zheng and Rama Chellappa, IEEE Proc. 4th International Conference on Computer Vision, 1993, pp. 335–339.

"Object Tracking Using Curvilinear Features" by J.G. Landowski and R.S. Loe, SPIE vol. 974 Applications of Digital Image Processing XI (1988), pp. 353–360.

"Moving Object Tracking Using Local Windows" by Celenk and Reza, IEEE International Symposium on Intelligent Control 1988, pp. 180–185.

"Estimating Three–Dimensional Motion Parameters of a Rigid Planar Patch" by Tsai and Huang, IEEE Pattern Recognition and Image Processing, 1981, pp. 94–118.

"Tracking Human Movements Using Finite Element Methods" by Wen–hung Liao, May 20, 1994.

"Object Tracking Through Adaptive Correlation" by Montera, Rogers, Ruck and Oxley, SPIE vol. 1959 Optical Pattern Recognition IV (1993), pp. 314–320.

"Object Tracking Through Adaptive Correlation" by Montera, Rogers, Ruck and Oxley, Vo. 33, No. 1, Optical Engineering, Jan. 1994, pp. 294–302.

"Tracking Multiple Features Using Relaxation" by Jim Z.C. Lai, Pattern Recognition, vol. 26, No. 12, pp. 1827–1837, 1993.

"3D Structure and Motion Estimation from 2D Image Sequences" by Tan, Baker and Sullivan, Image and Vision Computing, vol. 11, No. 4, May 1993, pp. 203–210.

"Object Tracking With a Moving Camera" by Burt, Bergen, Hingorani et al., Workshop on Visual Motion, 1989.

"A Semi–Automated Film/Video System for Motion Tracking" by Kohler, Glazer and Williams, SPIE vol. 1823, SPIE Machine Vision Applications, Architectures and Systems Integration, pp. 316–321.

"Segmentation of People in Motion" by Shio and Sklansky in IEEE Workshop on Visual Motion, 1991, pp. 325–332.

"Towards Model–Based Recognition of Human Movements in Image Sequences" by Rohr, Image Understanding, vol. 59, No. 1, Jan., 1994, pp. 94–115.

"Finding Trajectories of Feature Points in a Monocular Image Sequence" by Sethi and Jain, Transactions of Pattern Analysis and Machine Intelligence, vol. PAMI–9, No. 1, Jan. 1987, pp. 56–73.

"Feature Point Correspondence in the Presence of Occlusion" by Salari and Sethi, Transactions on Pattern Analysis and Machine Intelligence, vol. 12, No. 1, Jan. 1990, pp. 87–91.

"Camera Geometries for Image Matching in 3D Machine Vision" by Alvertos, Brzakovic and Gonzalez, Transactions on Pattern Analysis and Machine Intelligence, vol. II, No. 9, Sep. 1989, pp. 897–915.

"An Efficient and Accurate Camera Calibration Technique for 3D Machine Vision" by Tsai, IEEE Computer Vision and Pattern Recognition, 1986, pp. 364–374.

"Multiple Perspective Interactive Video" by Jain and Wakimoto, IEEE, 1995, pp. 202–211.

"Immersive Video" by Moezzi, Katkere and Jain, SPIE, vol. 2656, 1995, pp. 332–343.

"Uniqueness and Estimation of Three–Dimensional Motion Parameters of Rigid Objects with Curved Surfaces" by tsai and Huang, IEEE Pattern Recognition and Image Processing, 1982, pp. 112–118.

* cited by examiner

BEFORE MERGE

AFTER MERGE

LOGICAL VIEW

BEFORE SPLIT

BEFORE UPDATE

AFTER UPDATE

SYSTEM AND METHOD FOR TRACKING MOVEMENT OF OBJECTS IN A SCENE

This application claims the benefit of U.S. Provisional Application Ser. No. 60/050,972 filed Jun. 19, 1997.

CROSS REFERENCE TO RELATED APPLICATIONS

Cross reference is made to the following commonly assigned co-pending applications.

1. U.S. patent application Ser. No. 09/019,595, entitled "System And Method For Tracking Movement Of Objects In A Scene Using Correspondence Graphs," filed Feb. 6, 1998.
2. U.S. patent application Ser. No. 09/020,202, entitled "Object Tracking System And Methods For Utilizing Tracking Information," filed Feb. 6, 1998.
3. U.S. patent application Ser. No. 09/019,989, entitled "System And Method For Determining A Measure Of Correspondence Between Image Regions Representing Objects In A Scene," filed Feb. 6, 1998.
4. U.S. patent application Ser. No. 09/020,113, entitled "System And Method For Matching Image Information To Object Model Information," filed Feb. 6, 1998.
5. U.S. patent application Ser. No. 09/009,167, now U.S. Pat. No. 6,061,088 filed Jan. 20, 1998, entitled "System And Method For Multi-Resolution Background Adaptation," the entirety of which is incorporated herein by reference.
6. U.S. patent application Ser. No. 08/998,211, filed Dec. 24, 1997, entitled "System And Method For Segmenting Image Regions From A Scene Likely To Represent Particular Objects In The Scene," the entirety of which is incorporated herein by reference.

BACKGROUND OF THE INVENTION

1. Field of the Invention

The present invention relates generally to a video tracking system, and more particularly to a tracking system which tracks objects through a scene using video information representative of activity in the scene.

2. Description of the Related Art

Basic video tracking systems are well known in the art. The video tracking systems heretofore known lack certain functional capabilities required for generating accurate and comprehensive tracking information.

Celenk et al. in a 1988 IEEE article entitled "Moving Object Tracking Using Local Windows," disclose a simple tracking mechanism that employs frame differencing and centroid generation to track objects in a non-cluttered scene. This method is not-likely to be successful because it cannot process information from complex scenes and also cannot handle the movement of objects that split and merge.

Tsai et al. in IEEE articles, published in 1981, entitled "Estimating Three-Dimensional Motion Parameters Of A Rigid Planar Patch, and Uniqueness" and "Estimation Of Three-Dimensional Motion Parameters Of Rigid Objects With Curved Surfaces" disclose that only seven points on a rigid object are needed to uniquely find the motion parameters of the object from two images. The constraints on the seven points are provided, in order to yield a unique solution. While this method provides localized motion information, it is not a robust tracking solution.

Liao in a 1994 article entitled "Tracking Human Movements Using Finite Element Methods" discloses the use of a class of contours called Snakes with Finite Element Methods to extract and model the contour of a person as they walk through an environment. The method, though accurate, is not very efficient, and techniques for automatically initializing the algorithm must still be determined. Although this method might be used as part of a tracking system, it is not sufficiently robust to form a complete solution by itself.

Montera et al. in a 1993 SPIE article entitled "Object Tracking Through Adaptive Correlation" disclose the use of correlation templates to identify the location of objects in a scene, and track the object from frame to frame. The correlation template can adapt to changing image conditions over time. However, the object must maintain a fairly fixed, rigid form in order for correlation techniques to work, and therefore is limited in its application to the general tracking problem.

Burt et. al. in a 1989 article entitled "Object Tracking With A Moving Camera" provide a detailed, informative review of the use of "optical flow" for detection and analysis of motion. This particular technique is slow and computationally expensive. Sethi et al. in a 1987 article entitled "Finding Trajectories Of Feature Points In A Monocular Image Sequence" describe the use of path coherence and smoothness of motion as a cost measure for corresponding feature points on an object across image sequences. The cost measure is optimized on a sequence of frames using a technique called the Greedy Algorithm, which exchanges possible correspondences in order to optimize the cost measure. It is likely to work well in scenes in which feature points are easily extracted and maintained. However, it will not work well in cases of complex objects, object occlusion, object split and merge, and poor segmentation.

Salari et al. in a 1990 article entitled "Feature Point Correspondence In The Presence Of Occlusion" expands upon the previous work of Sethi and Jain by considering objects that are occluded. Specifically, the article discloses a set of phantom points which are constructed to represent the feature points missing due to occlusion. The Greedy Algorithm is updated to handle the phantom points. This method cannot handle complex objects.

There is a need for a sophisticated, yet cost effective, tracking system that can be used in many applications. For example, it has become desirable to acquire information concerning the activity of people, for example, within a scene of a retail establishment, a bank, automatic teller machines, bank teller windows, to name a few, using data gathered from analysis of video information acquired from the scene.

It is desirable to monitor the behavior of consumers in various locations of a retail establishment in order to provide information concerning the sequence of events and decisions that a consumer makes. This information is useful in many situations, such as, to adjust the location and features of services provided in a bank, to change merchandising strategies and display arrangements; etc. Consequently, it is necessary for the system to differentiate between people in the scene and between people and other stationary and moving objects in the scene.

A video tracking system is needed which can track the movement of complex objects, such as people, through a scene which may include complex objects itself. Moreover, a video tracking system which can function on an inexpensive computation platform offers significant advantages over the tracking systems heretofore known.

SUMMARY OF THE INVENTION

Briefly, the present invention is directed to a system and method for tracking movement of objects, such as people, through a scene. A background image comprising image information representing a background of the scene is generated. Image information for a video frame is compared with image information of the background image to generate regions in a video frame which potentially represent objects to be tracked in the scene. Region clusters are formed by combinations of regions if such combination satisfy predetermined criteria, and the region clusters are hypotheses of objects to be tracked. Each region cluster is evaluated to determine whether each represents an object to be tracked, based on object model information and correspondence to region clusters in a prior video frame. A confidence value is generated for each region clusters that represents a likelihood that the region represents an object to be tracked. A correspondence is determined between region clusters in consecutive video frames. Tracks of objects through the scene over time are constructed based upon the correspondence determined between region clusters in consecutive video frames.

The objects and advantages of the present invention will become more readily apparent when reference is made to the following description taken in conjunction with the accompanying drawings.

DETAILED DESCRIPTION OF THE INVENTION

Figure 1:
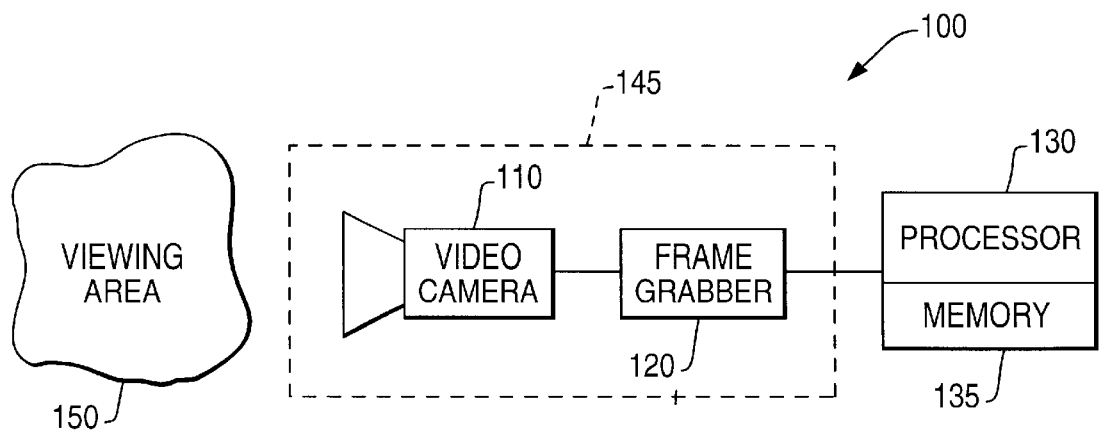
FIG. 1 is a block diagram showing the hardware components of the tracking system according to the present invention.

FIG. 1 illustrates the hardware components of the system according to the present invention. The hardware components are standard off-the-shelf components, and include one or more video cameras 110, one or more frame grabbers 120, and a processor 130, such as a personal computer (PC), having a memory 135 which stores software programs for controlling the processor 130. The combination of the video camera 110 and frame grabber 120 may collectively be referred to as an "image acquisition module" 145. The frame grabber 120 receives a standard video signal output by the video camera 110, such as a RS-170, NTSC, CCIR, or PAL video signal, which can be monochrome or color. In a preferred embodiment, the video camera(s) 110 are mounted or positioned to view a selected viewing area or scene 150 of interest, such as a checkout lane in a retail establishment, an automated teller machine (ATM), an entrance, an exit, or any other localized area where people or objects may move and/or interact with devices or other people or objects.

The frame grabber 120 is embodied, for example, by a Meteor™ Color Frame Grabber, available from Matrox. The frame grabber 120 operates to convert the analog video signal into a sequence or stream of digital video frame images that are stored within the memory 135, and processed by the processor 130. For example, in one implementation, the frame grabber 120 converts the video signal into a 2×2 sub-sampled NTSC image which is 320× 240 pixels or a 2×2 sub-sampled PAL color image which is 384×288 pixels, or in general a W×L image defining a single video frame of video information. A variety of other digital image formats and resolutions are also suitable, as will be recognized by one of ordinary skill in the art. Each pixel of a video frame has a predetermined bit resolution, such as 8 bits, and color data may be used to increase system performance. The digital information representing each video frame is stored in the memory 135 asynchronously and in parallel with the various processing functions described below.

Figure 2:
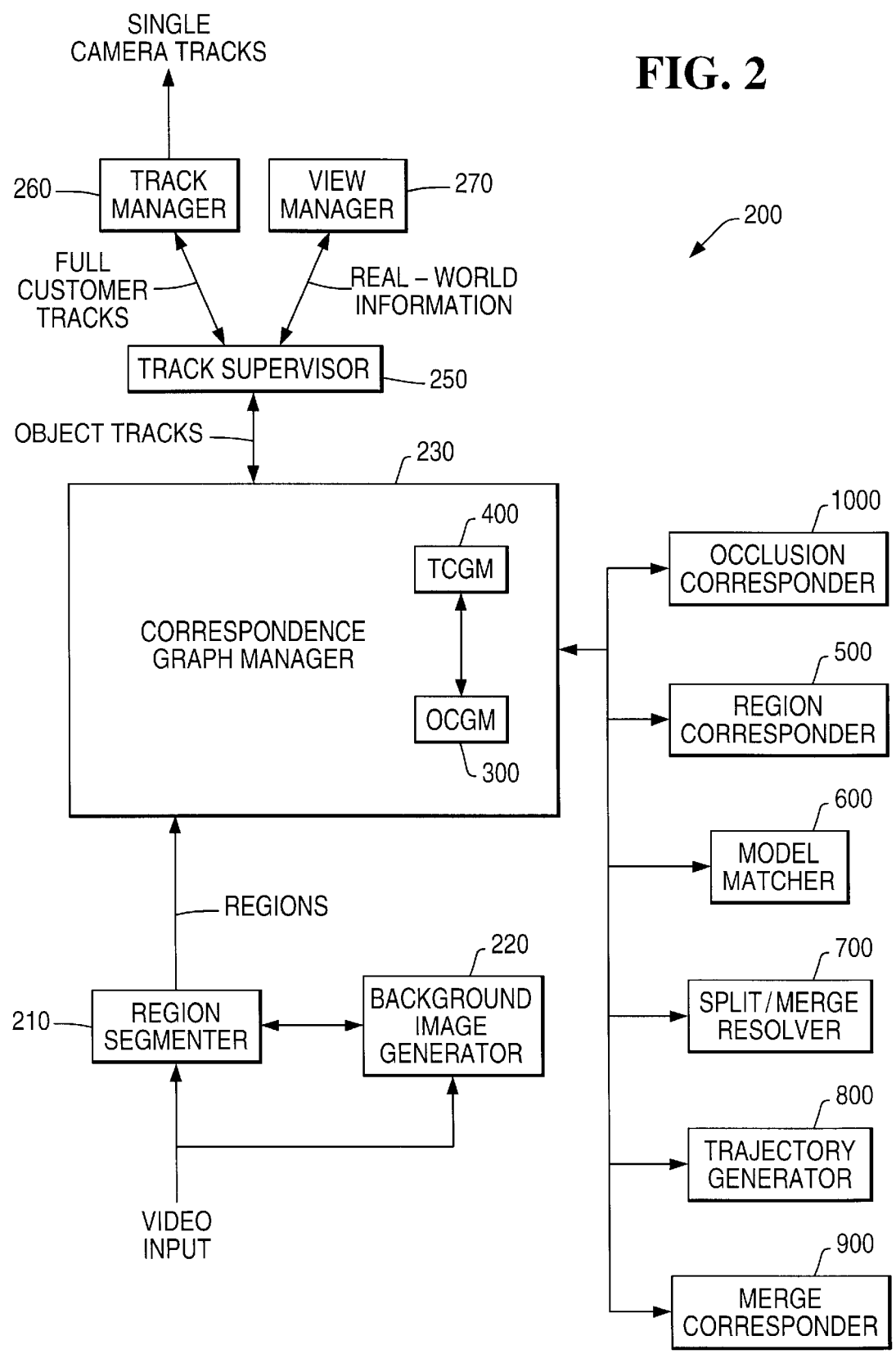
FIG. 2 is a block diagram of a flow chart illustrating the architecture of the tracking system according to the present invention.

Turning to FIG. 2, an architectural flow chart of a tracking system is shown. The tracking system is represented by reference numeral 200. Each block in FIG. 2 represents a function performed by a software program or module stored in the memory 135 and executed by the processor 130. The processor 130 is part of an industry standard personal computer (PC) using a standard operating system, such as Windows NT®.

The individual functions of the tracking system are preferably implemented by way of a software program that may be installed in the memory 135 from another memory/storage medium, such as a CD-ROM, floppy disk(s), hard disk, etc., or it may be downloaded from an internet site, or from an on-line service for installation into the memory 135. The tracking system is implemented by several software programs or modules, each comprising a plurality of executable instructions which, when stored in the memory 135, cause the processor 130 to perform the processes shown and described hereinafter. However, one with ordinary skill in the art will appreciate that the region segmentation functionality could be implemented by one or more application specific integrated circuits, a digital signal processor or other suitable signal processing architectures.

The tracking system 200 comprises a region segmenter 210 and a background image generator 220. Each receives as input video frames representing activity within the scene. The region segmenter 210 extracts regions from the video frames that likely correspond to objects to be tracked or identified in the scene. The regions are extracted with reference to a background image that is generated by the background image generator 220.

There are many ways to generate a background image generator. A method and system developed by the assignee of the present application is disclosed in U.S. patent application Ser. No. 09/009,167, filed Jan. 20, 1998 now U.S. Pat. No. 6,061,088, entitled "System and Method for Multi-Resolution Background Adaptation". Similarly, a method and system for performing region segmentation developed by the assignee of the present invention is disclosed in U.S. patent application Ser. No. 08/998,211, filed Dec. 24, 1997, entitled "System and Method for Segmenting Image Regions From a Scene Likely to Represent Particular Objects in the Scene". The entirety of these prior applications are incorporated herein by reference.

The correspondence graph manager (CGM) 230 receives as input the regions output by the region segmenter 210. The output of the CGM 230 are the set of tracks generated for objects as they move through the field of view of the camera. The CGM 230 divides the tracking problem into two smaller problems, the generation of highly confident object track segments over a short period of time, and the linking of these highly confident track segments over a long period of time in order to form complete tracks. Accordingly, the CGM 230 comprises an object correspondence graph manager (OCGM) 300 and a track correspondence graph manager (TCGM) 400. The OCGM 300 constructs short term track segments. These track segments are then forwarded to the TCGM 400 which links track segments to form a complete track. The OCGM 300 and TCGM 400 manage two data objects in order to perform the tracking task, a first correspondence graph called an Object Correspondence Graph (OCG) and a second correspondence graph, called a Track Correspondence Graph (TCG). The OCGM 300 will be described in greater detail under the heading OBJECT CORRESPONDENCE GRAPH MANAGER and the TCGM 400 will be described in greater detail under the heading TRACK CORRESPONDENCE GRAPH MANAGER.

Referring back to FIG. 2, the remainder of the architecture of the tracking system 200 will be described. The track supervisor 250 receives tracks and other information from the TCGM 400 in response to certain trigger signals generated by the CGM 230 and outputs real-world object tracking information.

The track manager 260 provides long term storage of tracking information as well as on-line access to current tracking information.

The view manager 270 uses a priori information about the scene viewed by a video camera and generates real world transformation parameters to assist the track supervisor in outputting real world tracking information.

The tracking system 200 tracks movement of objects through a scene or viewing area. In particular, it tracks movement of people through a scene. However, the tracking system according to the present invention is not limited to tracking people: it is suitable for tracking vehicles, and other objects through a scene. The term "object" is used hereinafter in the description of the tracking system, and it is meant to include people, portions of a person (such as a hand, head, feet, etc.), vehicles, animals, and any other movable thing whose movement is desired to be tracked.

The tracking system operation may be summarized as a method for tracking movement of objects in a scene from a stream of video frames, each video frame comprising image information of the scene at an instant of time, comprising steps of: generating regions in a video frame which potentially represent objects to be tracked in the scene; comparing each region with object model information and generating a confidence value for each region that represents a likelihood that the region represents an object to be tracked; determining a correspondence between regions in consecutive video frames; and constructing tracks of objects through the scene over time based upon the correspondence determined between regions in consecutive video frames.

OBJECT CORRESPONDENCE GRAPH MANAGER

Figure 3:
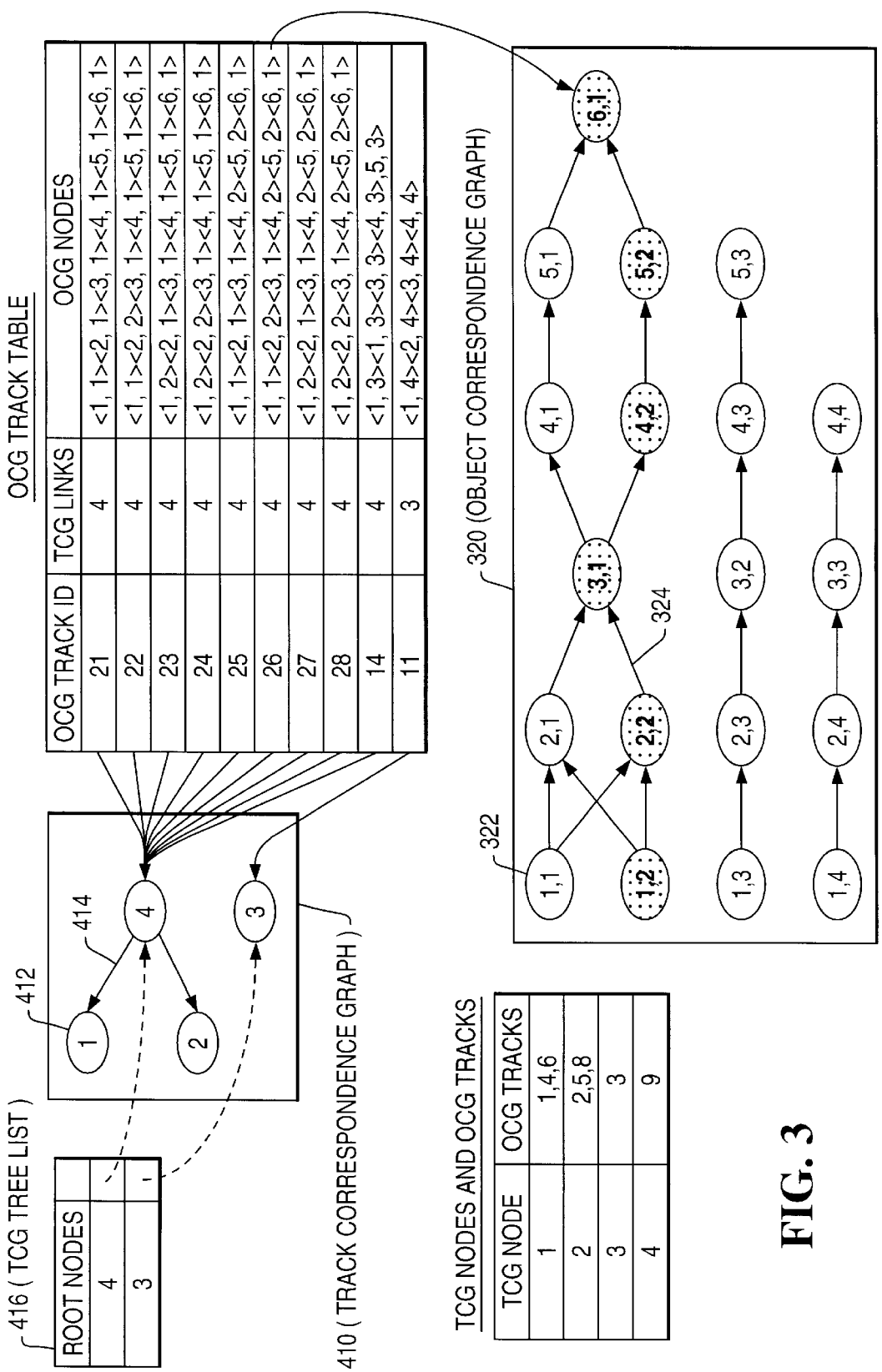
FIG. 3 is a diagram showing an overview of how the tracking system constructs tracks according to the present invention.

Referring to FIG. 3, the OCG is shown at reference numeral 320. The OCG 320 represents the relationship between objects over time. The OCG 320 is a directed acyclic graph (DAG). The graph is composed of one or more levels, each level representing a moment in time. The OCG 320 contains six levels. Each graph level contains zero or more nodes, i.e. objects, for a particular moment in time. Each node in the OCG 320, called an OCG node 322, represents an object to be tracked. In the OCG 320, three OCG nodes, (3,1), (3,2), and (3,3), compose level three in the graph. Associated with each OCG node is the likelihood that the object at time t is the particular type of object to be tracked. This is determined by invoking a model matcher with the object. Each arc 324 in the graph links an object at time t, $O_t$, to the set of objects at time t+1 that potentially correspond to $O_t$. Each arc in the graph has an associated weight which describes the correspondence, degree of match, between an object at time t and time t+1. The weight of each arc is determined by the region corresponder 500 (referred to hereinafter) and/or the split/merge resolver 700 (referred to hereinafter).

An OCG track 324 is an ordered set or sequence of nodes from the OCG 320 that represents the path of an object through the camera view for a short period of time, i.e., a track segment. The set of OCG tracks are maintained in the OCG Track Table shown in FIG. 3. OCG tracks are identified by searching the OCG 320 for sequences of nodes that have high correspondence scores as well as high model match confidence scores. Each OCG track 324 maintains a track confidence, a value from 0.0 to 1.0, that represents the overall confidence of the object track. Also, each OCG track maintains a list of TCG track links, described in greater detail under the heading TRACK CORRESPONDENCE GRAPH MANAGER, that link OCG tracks to previously generated OCG tracks.

The inputs to the OCGM 300 are the set of regions extracted from a video frame by the region segmenter 210. The output of the OCGM 300 are short term high confidence tracks generated from the analysis of a predefined number of frames, generally eight to ten. OCG tracks 324 are forwarded to the TCGM 400. The OCGM 300 calls upon the functions of several other modules, including a region corresponder 500, a model matcher 600, a split/merge resolver 700, a trajectory generator 800 and a merge corresponder 900.

Figure 4A:
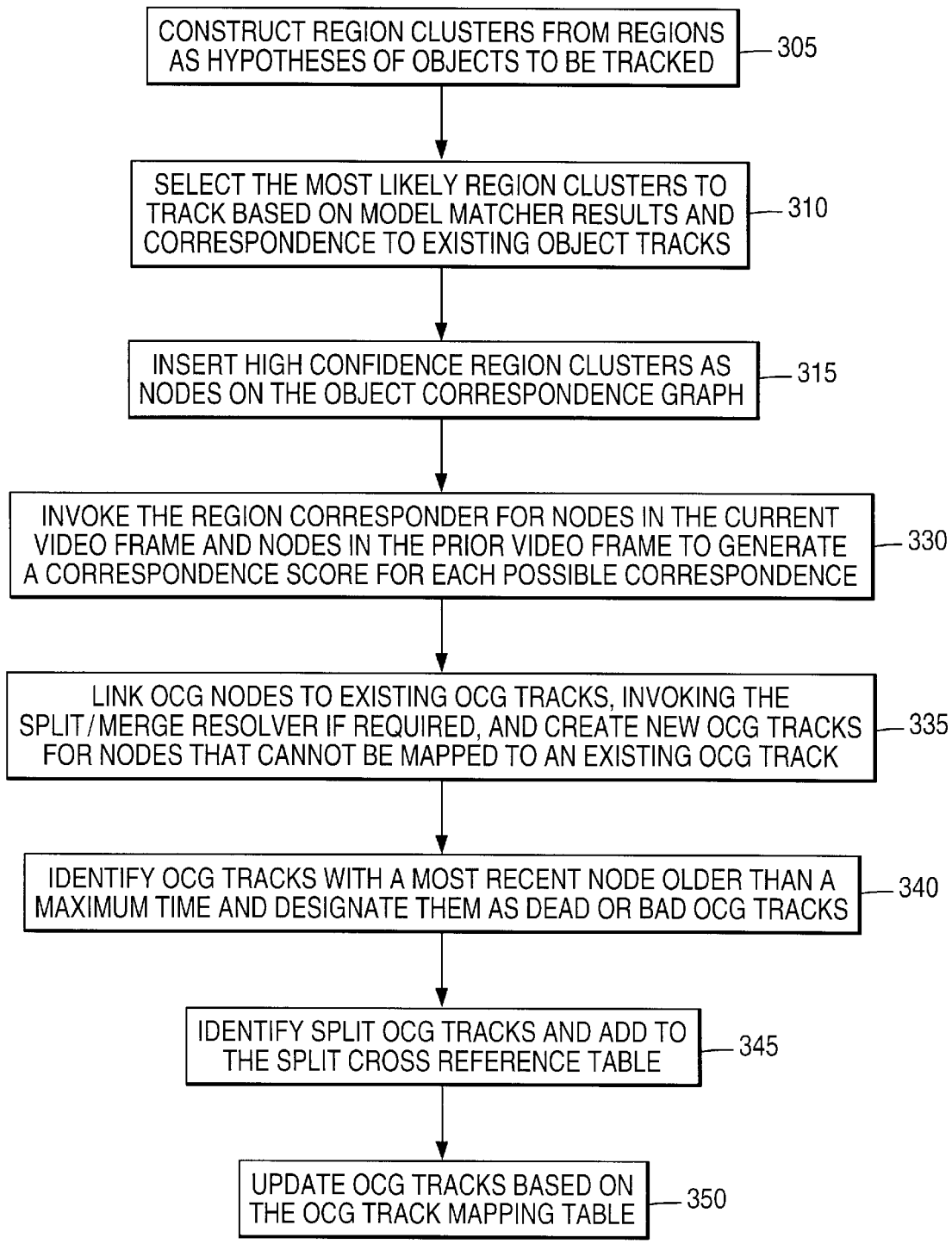
FIGS. 4A and 4B illustrate a flow chart depicting the operation of the object correspondence graph manager.
Figure 4B:
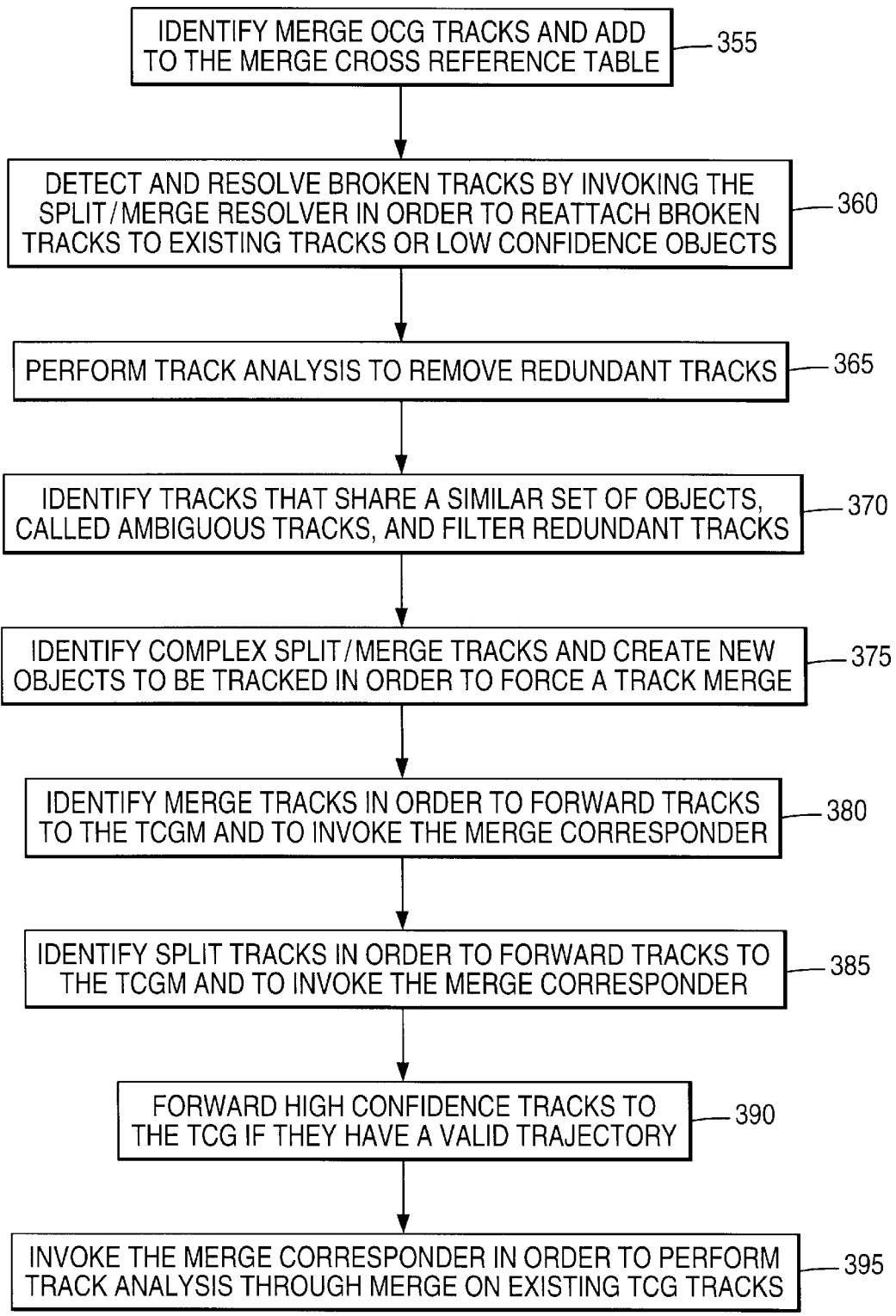

Turning to FIGS. 4A and 4B, the operation of the OCGM 300 will be described.

Create Region Clusters

The OCGM 300 begins in step 305 by constructing a set of region clusters from the regions output by the region segmenter 210. There are many ways to generate the regions, and one way is to compare image information for a video frame with image information for a background image (which is periodically generated). Each region cluster comprises one or more regions that are hypotheses of objects in the scene to be detected and/or tracked. There are a set of region cluster size constraints that control how regions are grouped into region clusters.

1. Width. The bounding box of the region cluster must be greater than a minimum width and less than a maximum width.
2. Height. The bounding box of the region cluster must be greater than a minimum height and less than a maximum height.
3. Total pixels. The total number of pixels comprising the region cluster must be greater than a minimum number of pixels and less than a maximum number of pixels.
4. Minimum density. The density of a region cluster is calculated by dividing the total number of pixels by the area of the bounding rectangle. The bounding rectangle is defined as the minimum rectangle that contains all pixels comprising the region cluster. The density must exceed a minimum density value.
5. Maximum distance. The distance between two region clusters can be approximated by the distance between the bounding rectangles. This distance must be less than a maximum distance.

All combinations of regions are considered for generating region clusters, within these constraints.

Figure 5:
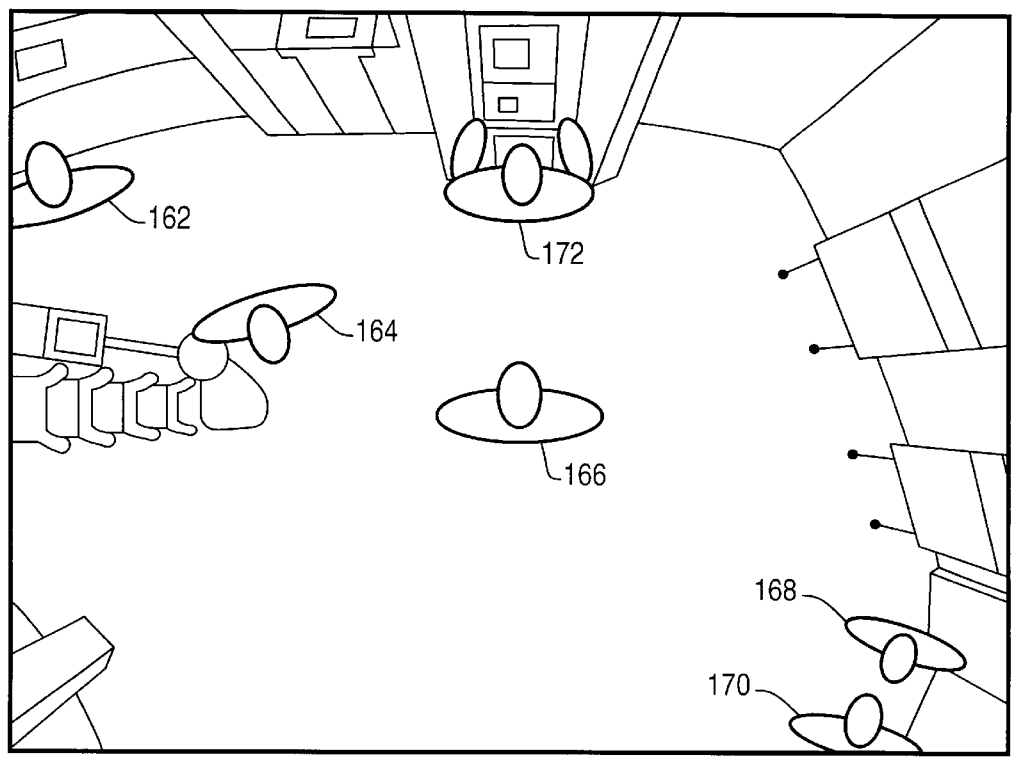
FIG. 5 is a pictorial representation of a video frame.
Figure 6:
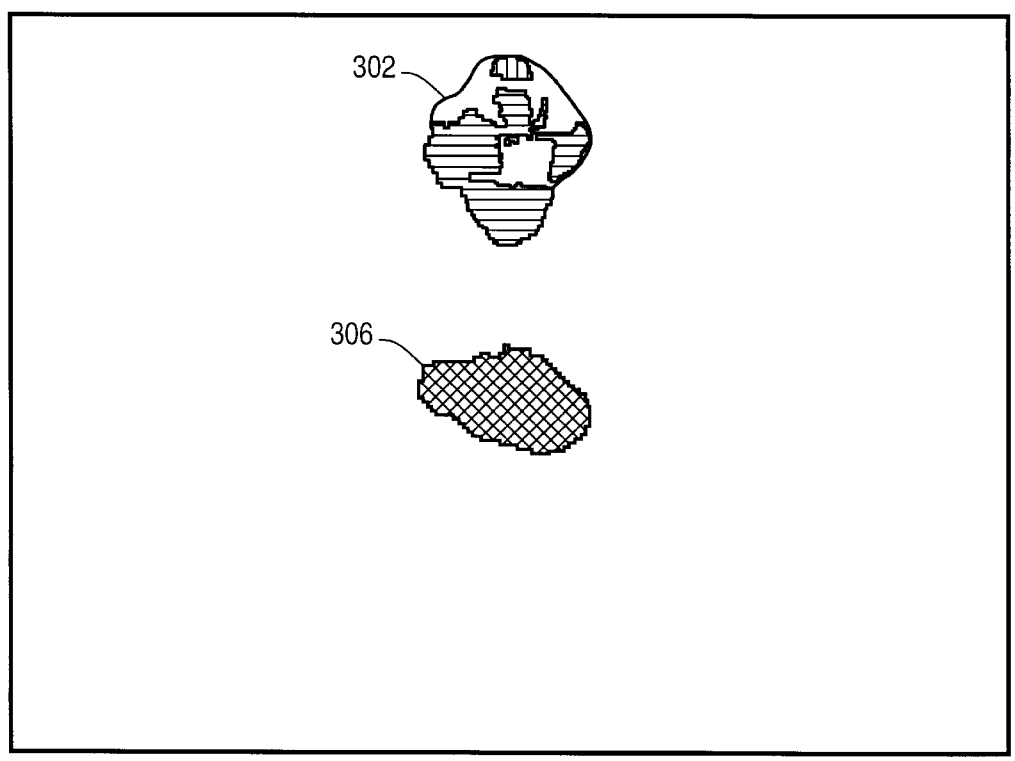
FIG. 6 is a diagram showing region clusters formed from regions extracted for parts of images from the video frame of FIG. 5.

As an example, reference is made to a sample video frame of a scene, shown in FIG. 5. It can be seen from the video frame in FIG. 5 that there are several image regions in the scene that potentially represent people, shown at reference numerals 162, 164, 166, 168, 170 and 172. FIG. 6 shows the regions generated by the region segmenter 210 corresponding to the people objects at reference numerals 166 and 172 (only these are chosen for explanatory purposes) in the video frame shown in FIG. 5. The regions corresponding to these people objects are grouped into region clusters 302 and 306, respectively. Small regions may be grouped into a region cluster with larger regions, such as that represented by region cluster 302. Larger regions may constitute their own region cluster, such as region cluster 306. Thus, a region cluster may consist of one region, or combinations of many regions, which is a hypothesis of an object to be tracked.

Evaluate Region Clusters

Next, in step 310, the OCGM 300 evaluates whether each region cluster is an object to be tracked. The OCGM 300 evaluates each region cluster and generates a confidence value, for example, a value between 0.0 and 1.0 that represents the likelihood that the object is a particular object to be tracked, such as a person. The confidence value is called $TC_{Object}$. $TC_{Object}$ is computed by the following steps:

1 1. The model matcher 600 is invoked to evaluate whether each region cluster is an object to be tracked. The model matcher 600 evaluates each region cluster and returns a confidence value, for example, a value between 0.0 and 1.0 that represents the likelihood that the object is a particular object to be tracked, such as a person. The operation of the model matcher 600 is described hereinafter in conjunction with FIGS. 7–9, under the heading MODEL MATCHER. This confidence value is called $C_{object}$.

2. The region corresponder 500 is invoked to evaluate the degree of correspondence between an object extracted from the current frame and all objects from the previous frame. The maximum correspondence score, called $C_{correspondence}$, is determined along with the associated best track confidence, called $C_{track}$, for the corresponding object. $C_{track}$ is found by finding the largest track confidence from the set of tracks that contains the maximum corresponding object. Also, the maximum length of the associated track is stored in TrackLength. The track length includes the OCG track length plus the longest TCG track length, if a TCG links exists.

3. $TC_{Object} = W_1 * C_{object} + (w_1 + (1-2^{-TrackLength}) * w_2) * C_{correspondence} * C_{track}$, where $w_1 + w_2 = 1.0$.

The weights $w_1$ and $w_2$ determine if the overall object confidence is biased towards the model matcher 600 results or the track confidence. In a current embodiment, $w_1 = 0.2$. This results in objects that have a high degree of correspondence to a long existing track having a better confidence score than objects with weak correspondence scores.

While the correspondence score has been described as representing a measure of correspondence of region clusters in consecutive video frames, the term "consecutive" is meant to include immediately consecutive video frames as well as every other one, two, three, etc., video frames, such that the image information for every video frame may not be processed.

Now, given the set of region clusters, the OCGM 300 determines the best set of region clusters to retain. Regions clusters with the largest confidence, $TC_{Object}$, will be retained. The following steps are performed in order to create the list of region clusters to maintain.

1. Find the region cluster, region cluster A, with the largest confidence, $TC_{Object}$.
2. Discard all region clusters that share a subset of common regions, that is area, with region cluster A that do not meet the following constraints. Let $TC_A$ be the $TC_{Object}$ of Region Cluster A and let $TC_B$ be the $TC_{Object}$ of Region Cluster B, the region cluster in question, then discard Region Cluster B from the set of objects to be tracked if
   (a) $TC_A > TC_B$, and
   (b) $(TC_A - TC_B)/minimum(TC_A, TC_B) > 0.1$.
3. Discard region cluster A and repeat step 1 if
   (a) $TC_A < 0.1$, and
   b) $C_{object}$ of Region Cluster A<0.1 and the real world width and height of the object, determined by the model matcher 600, both are less than their respective minimum thresholds, $Height_{min}$ and $Width_{min}$.
4. Add region cluster A to the low confidence object list and repeat step 1 if
   (a) $TC_A < 0.1$, and
   (b) $C_{object}$ of Region Cluster A<0.1 and the real world width or height, not both, of the object are less than their respective minimum thresholds, $Height_{min}$ and $Width_{min}$.

5. Add region cluster A to the high confidence object list and repeat step 1.

The output of this process are two region cluster lists. The high confidence object list contains the set of regions clusters that have a high likelihood of being an object to be tracked. The low confidence object list contains region clusters that have a low likelihood of being an object of interest, but may be of use in later processing steps of the OCGM 300.

Insert Regions Clusters on Object Correspondence Graph

Next, in step 315, region clusters which are generated in step 310 and retained, hereinafter called high confidence region clusters, are inserted into the OCG.

Determine Correspondence to Nodes in Prior Frame

The association of a node in one frame to a node in a next or previous frame is determined by the region corresponder 500. In step 330, the region corresponder 500 is invoked for nodes in the current video frame and nodes in the prior video frame to generate a correspondence score for each possible correspondence between nodes in the current video frame and nodes in the prior video frame. The region corresponder 500 will be described in greater detail in conjunction with FIGS. 10–13, under the heading REGION CORRESPONDER. The correspondence score is a measure of correspondence between a node (region cluster) in one frame and a node (region cluster) in subsequent or previous frame. That is, the correspondence score indicates the likelihood that a region cluster in one frame is the same as the region cluster in a prior or subsequent frame.

Link Nodes to OCG Tracks

In step 335, the nodes for the current video frame are linked to an existing OCG track. Linking new OCG nodes to existing OCG tracks involves identifying valid pairings of new OCG nodes with the most current node on each existing OCG track based on correspondence scores and other information. OCG nodes are linked to OCG tracks that contain nodes which were obtained in the previous frame. If an OCG track has broken (for reasons explained hereinafter), preferably, no attempt is made to link a new OCG node to that track at this stage of the process. It is possible that a single OCG may map to multiple OCG nodes and/or that multiple tracks may map to a single OCG node.

A new OCG node is linked to an OCG track if the most recent node of the OCG track has a high correspondence score to the new OCG node, and if no other node in the OCG has a significantly higher correspondence score to that same new OCG node. The rule is:

1. Assume time t is the current video frame.
2. Let n1 be the most recent node on an OCG track, T1, and n2 be a new OCG node generated from the current frame.
3. Let w represent the correspondence score between n1 and n2.
4. BestScore is the best correspondence score from n1 to any (most recent) node in the OCG, except n2, at time t.
5. OtherScore is the best correspondence score from n2 to any node in the OCG, except n1, at time t−1.
6. MinimumDistance is the minimum allowed correspondence score, calculated as
   MinimumDistance=maximum(BestScore-BestOffset, MinimumCS),
   where MinimumCS is the minimum correspondence score allowed by the OCG.
7. The new OCG node n2 maps to OCG track T1 if:
   (a) w is greater than a predetermined minimum correspondence score, MinimumFilter, or
   (b) w is greater than MinimumDistance and w is greater than (OtherScore—OtherOffset).

MinimumFilter results in any pairing of nodes n1 and n2 with a correspondence score exceeding a threshold, the MinimumFilter, being mapped. BestOffset and OtherOffset are parameters used to allow multiple links to a single OCG node in order to accommodate inaccuracies in the region corresponder 500. As the value BestOffset and OtherOffset increase, the probability of multiple mappings to a single node increases.

In the event that a new OCG node cannot be linked to an existing OCG track, based on region corresponder 500 results, the split/merge resolver 700 is invoked to determine if a node can be linked to an existing track based on an alternative correspondence model. The split/merge rsolver 700 uses an orthogonal feature set to the region corresponder 500, and is tuned to resolve the splitting and merging of objects. Rules 1 through 7 that were previously applied to correspondence scores are now applied to the split/merge resolver 700 correspondence scores. If a new OCG node can still not be linked to an existing OCG track, a new OCG track is created beginning with that OCG node. The split/merge resolver 700 is explained in conjunction with FIGS. 15 and 16, under the heading SPLIT/MERGE RESOLVER.

After the new OCG nodes for a video frame are mapped to OCG tracks, an OCG Track Mapping Table is created that contains the current mappings of nodes to OCG tracks for the OCG. A Tracking Table entry consists of a node reference and an OCG Track reference. Also, in step 335, the trajectory generator 800 is invoked to determine trajectory information for each track. The trajectory generator 800 is described in further detail in conjunction with FIG. 14, under the heading TRAJECTORY GENERATOR.

Identify Bad or Dead OCG Tracks

In step 340, tracks which have a most recent OCG node that is older than a predetermined maximum period of time, called MaxDeadTime, are designated as "dead" tracks. Dead tracks are identified by searching the list of active OCG tracks. Each dead track is marked with a status of either DEAD or BAD. A dead track is a BAD track if it is determined that it has no links to any existing TCG tracks and that it is shorter in length than a minimum dead track length, called MinDeadLength. Otherwise, the dead track is simply marked as DEAD.

It is important to be able to distinguish DEAD tracks from BAD tracks in order for the TCGM 400 to function properly, as will become apparent hereinafter. A BAD track is a track that is erroneously generated and should be discarded by the system. A DEAD track is often the completion of an active track, or the complete track of an object in the scene. When a track is marked DEAD or BAD, the track information is forwarded to the TCGM 400 so that the TCG can be updated. The track is then removed from the active track list managed by the OCGM 300.

Identify Split Tracks

Next, in step 345, split OCG tracks are identified. When a single OCG track links to multiple nodes, it is said that the track is split. At this stage, the split is not analyzed. Split tracks are identified by searching the OCG Track Mapping Table to locate multiple entries for the same OCG track. When a duplicate OCG track entry is found, a new track is created that is a copy of the existing track. The copy includes the set of all nodes prior to the frame that generated the split, as well as any track specific information, such as the TCG links of the original track, the track trajectory information and the track confidence. After the track is duplicated, $T^1$, the OCG node contained in the OCG Track Mapping Table entry is added to the new track $T^1$ and the new track $T^1$ is added to the OCG active track list. The original track and each new track are added to a table, called the Split Cross Reference Table. All track entries in the OCG Track Mapping Table for the split track are deleted.

Update OCG Tracks

In step 350, all tracks not updated in step 345 are updated. For each entry remaining in the OCG Track Mapping Table, the OCG track is updated with the associated OCG node. All entries are deleted from the OCG Track Mapping Table.

For each active OCG track, the track confidence is updated. The track confidence is computed by the method described in 310, Evaluate Region Clusters. The track confidence is set to $TC_{Object}$, where $C_{correspondence}$ is the correspondence score between the last two nodes in the OCG track and $C_{track}$ is the previous OCG track confidence.

Identify Merged Tracks

Turning to FIG. 4B, in step 355, merged OCG tracks are identified. Merged tracks are identified by searching the active track list to locate tracks that share the same most recent node. Only tracks that contain a node in the current frame are considered during this search. The set of tracks sharing the common node are added to a table called the Merge Cross Reference Table. Alternatively, the merge constraint can be relaxed to include tracks that map to two nodes that share common regions.

Detect and Resolve Broken Tracks

In step 360, the OCGM 300 analyzes the set active OCG tracks that do not contain a node from the current frame. That is, the set of active tracks that contain a node from the previous frame that do not have an adequate correspondence to a node in the current frame, called the set of broken tracks. The region corresponder 500, employed to generate correspondence scores, is very sensitive to changes in global object features. In some instances, correspondence failure may be a result of drastic changes in the global feature set. To address these potential correspondence failures, the following processing steps are performed.

First, for each broken OCG track, $T_{broken}$, determine if there is an existing OCG track, T, that contains a node at time t−1 that shares a significant amount of area with the node at time t−1 in $T_{broken}$. The minimum amount of area is an OCGM parameter. If such a track is found, add the node at time t from track T to $T_{broken}$.

For each track that is still broken, the split/merge resolver 700 is invoked, using as input the node at time t−1 for $T_{broken}$ and the set of nodes at time t from the set of active OCG tracks. Also, the split/merge resolver 700 is invoked, using as input the node at time t−1 for $T_{broken}$ and the set of low confidence objects created by the OCGM 300. The split/ merge resolver 700 is explained in conjunction with FIGS. 15 and 16, under the heading SPLIT/MERGE RESOLVER. Briefly, the split/merge resolver 700 operates on region clusters from a pair of consecutive frames and determines the correspondence between a single region cluster, called the original region cluster, and a plurality of candidate region clusters from the next frame. A correspondence confidence value is returned for each candidate region cluster and is used in further analyzing the tracks in the OCG.

The information generated by the split/merge resolver 700 is used by the OCGM 300 to do what otherwise could not have been done in step 335 because the region corresponder 500 was not able to return adequate information. Based on the results returned from the split/merge resolver 700, if the correspondence value exceeds a minimum split/merge resolve threshold, a track mapping is creating from the broken track $T_{broken}$ to the corresponding node. If the corresponding node belongs to an active track, T, the OCGM 300 validates that the track confidence of $T_{broken}$ is not significantly lower than the confidence of T. This test keeps low confidence tracks from being attached to high confidence tracks. If a correspondence is found and the track test is passed, an OCG Track mapping is created for $T_{broken}$ and the corresponding node.

After all broken tracks have been processed, a new OCG Track Mapping Table has been created. Then, steps 345, 350 and 355 are now repeated given the set of updated tracks.

Perform Track Analysis

In step 365, track analysis is performed to reduce the number of active tracks. At this point, the track space is searched for tracks that share a large percentage of common nodes that may be the result of errors in region segmentation or ambiguous results from the model matcher 600. Situations may be encountered in which there is sporadic creation of multiple object hypotheses for the same object. These objects would share the same regions. Also, it is possible that high frequency splitting and merging of regions may have occurred from the same object.

Since the system is tracking the same object on multiple tracks, the set of common tracks can be consolidated. Consolidation of tracks consist of deleting all but one of the common tracks. The track to retain is the longest OCG track. If two or more tracks are the same length, the track with the largest track confidence is retained. When a track is deleted, the track information, such as TCG links, is consolidated in the remaining track. Tracks that meet any of the criteria below can be consolidated:

1. A track that is a subset, contains the same set of nodes, as a second track.
2. Two tracks of a predetermined length (a short term length) share the same start node and end node.

Two tracks of a significant length, greater than a predetermined length, share at a minimum every other node in the track. This is indicative of a high frequency split or merge. "Shared" in this context means common nodes or two nodes that have a common region, i.e., they overlap.

Additional criteria can be added so that tracks are pruned from the track search space early. The primary impact is to reduce the search space for ambiguous tracks that is described in the section below.

Process Ambiguous Tracks

In step 370, ambiguous tracks are processed. This step is performed to reduce the number of active tracks.

First, ambiguous tracks are identified and grouped into sets of ambiguous tracks in the Ambiguous Cross Reference Table. Ambiguous tracks are tracks that share one or more common nodes. Tracks that are identified as ambiguous are listed in a table called the Ambiguous Cross Reference Table. Each table entry contains a list of tracks that are ambiguous, i.e. each track is ambiguous with one or more tracks in the entry.

Second, dead ambiguous tracks are deleted. A dead ambiguous track is an OCG track that has no TCG links and has been broken for more than a predetermined period of time, represented by an ambiguous dead time frames parameter. An ambiguous dead track is a spurious track that was created by the system with no links to other tracks. These tracks are immediately deleted from the active track list.

Third, the OCGM 300 attempts to delete a subset of the active ambiguous tracks. The following steps are performed on each set of ambiguous tracks in order to remove tracks and reduce the number of active tracks.

1. Find the track with the largest number of TCG links, track A. If two tracks have the same number of TCG links, select the track with the largest track confidence value.

2. Remove track A from the ambiguous track list.
3. Validate that the length of track A track exceeds the maximum ambiguous track length or that the dead time exceeds the maximum ambiguous dead time.
4. If track A is not valid, save track A on the "okTrack" list and go to step 1.
5. Delete all tracks from the Ambiguous Track Cross Reference table and the active track list that contain a subset of the TCG links contained in track A.
6. Add track A to the "okTrack" list.
7. Go to step 1.

After processing all tracks, tracks on the "okTrack" list are returned to the ambiguous tracks list to be processed later. Any track that is deleted from the track list is also deleted from the Split Cross Reference Table and the Merge Cross Reference Table.

Next, merging of shared segments is performed so that ambiguous tracks that are tightly bound to other ambiguous tracks are deleted. Shared segments are identified by selecting the longest ambiguous track as the reference track. If two tracks are the same length, the track with the greatest track confidence level is selected. The reference track must exceed a predetermined length set by a minimum ambiguous shared segment track length parameter. Each ambiguous track is then compared with the reference track in order to identify tracks that contain a set of nodes, where each node shares regions with nodes on the reference track. In the current embodiment, since ambiguous tracks are based on shared nodes, the track will be a track segment. However, the TCG links may differ. If a shared segment is found, the shared track is deleted from the active track list. TCG links from the shared track are added to the reference track. Any track that is deleted from the track list is also deleted from the Split Cross Reference Table and the Merge Cross Reference Table.

Finally, the set of tracks that remained ambiguous are analyzed to determine if a split condition has been created by the deletion of tracks. In some instances, a split condition may not have been previously detected due to the existence of spurious tracks. When the spurious tracks are deleted, the OCGM 300 can then properly detect a split condition. A split condition occurs when all tracks in an Ambiguous Cross Reference Table Entry meet the following criteria.

1. The most recent OCG nodes in the set of ambiguous tracks share less than a predefined maximum amount of common area, called the Maximum Split Area.
2. The set of ambiguous tracks at some point in the past share the same OCG node.

If this condition exists, the set of ambiguous tracks generating the split condition are added to a Split Cross Reference Table entry.

Detect Complex Split/Merge Conditions

In some instances, the state of a subset of OCG tracks can become very complex, and the OCGM 300 requires drastic actions to address the situation. In step 375, the OCGM 300 searches the Merge Cross Reference Table and the Split Cross Reference Table to identify OCG tracks that are contained on both a Split Cross Reference Table entry and a Merge Cross Reference Table entry. If such a track is found, the following steps occur.

1. Construct a list of tracks, $T_{List}$, that are contained in the same Split Cross Reference Table entry and Merge Cross Reference Table entry. When adding a track T to $T_{List}$, all other tracks that share a cross reference with T must also be added to $T_{list}$.
2. Remove cross reference table entries for each track on $T_{list}$.
3. Construct a new OCG node, $O_{new}$, and region cluster that consists of the set of regions that compose all of the region clusters for each node in the current frame for the set of tracks on $T_{list}$.
4. Add the new OCG node, or object to be tracked, to the OCG if an object consisting of the same set of regions does not exist.
5. Replace the most recent node of each track on $T_{list}$ with $O_{new}$.
6. Perform steps 365 and 370 on $T_{list}$ in order to eliminate duplicate and ambiguous tracks that may have been created at step 5.
7. Create a new Merge Cross Reference Table Entry for the set of tracks on $T_{list}$.

The OCG has determined that the results of object creation and region correspondence are not adequate to allow the objects to be properly tracked. Therefore, the OCG has created a large object and is forcing a merge condition, which allows the system to resolve the situation when more accurate information is available.

Analyze Merged Tracks

In step 380, the OCGM 300 searches the Merge Cross Reference Table to identify tracks of two or more objects that have been linked to a single object in the current frame. It is important to accurately identify a merge so that the merge event and tracks can be reported to the TCGM 400. Merge analysis is performed on tracks in the Merge Cross Reference Table. The following properties are used to detect a merge:

1. If the tracks are linked to different TCG tracks, a merge exists.
2. If the two tracks do not contain nodes that share regions, a merge exists.

If a merge is successfully detected, each merged track is forwarded to the TCG. A new OCG track, $T_{merge}$, is created and linked to the TCG tracks that contains the forwarded OCG tracks. The TCG track linking must occur in order to resolve the merge in the future, if a split occurs.

In order to track objects while merged, the merge transition stage 910 of the merge corresponder 900 is invoked given the set of region clusters in the OCG tracks prior to the merge and the region cluster creating the merge. The results returned from the merge corresponder 900 are then stored in the new OCG track, $T_{merge}$. The merge corresponder 900 is explained in more detail hereinafter under the heading MERGE CORRESPONDER, in conjunction with FIGS. 20 and 21.

Analyze Split Tracks

In step 385, the OCGM searches tracks in the Split Cross Reference Table to identify tracks of a single object that have been linked to two or more objects in the current frame. It is important to accurately identify a split so that the split event and tracks can be forwarded to the TCG. A split condition exists if the most recent OCG nodes in the tracks share less than a predefined maximum amount of common area, called the Maximum Split Area.

If a split is successfully detected, the OCGM 300 forwards the split tracks to the TCG. New OCG tracks are created for each node in the current frame and linked to the corresponding TCG tracks containing the forwarded OCG tracks.

Finally, the split transition phase 930 of the merge corresponder 900 is invoked given the set of region clusters in the new OCG tracks, that is the set of region clusters after the split, and the previous frame merge corresponder 930 results in order to resolve a split/merge situation. If the split tracks are not actively performing a split/merge resolution, i.e, a merge did not occur prior to the split, the merge corresponder 900 is not invoked. The results, the set of track mappings, are then stored in the new OCG tracks and will processed by the TCG when the OCG tracks are forwarded.

Forward Tracks to TCG

Finally, in step 390, tracks in the OCG are forwarded to the TCG. Specifically, high confidence tracks are forwarded to the TCG when:

1. The track length exceeds a predetermined minimum track length set by an OCG forward track length parameter.
2. The track is not marked as ambiguous.

When forwarding a track to the TCG, its trajectory status is also examined. If the trajectory status for the track is bad or invalid, then the track is forwarded to the TCG with a BAD status and the track is deleted from the active track list. If the track trajectory is valid, then the following occurs:

1. The last node, nLast, is deleted from the track.
2. A new track is created that contains the single node nLast
3. The track is forwarded to the TCG.
4. The new track is linked to the TCG track containing the forwarded OCG track.
5. The new track is added to the active track list.

Track Through A Merge

The final operation of the OCG is to track through a merge in step 395. If an active OCG track is performing a track through the merge operation, the merge corresponder 900 must be invoked. The track was previously updated with the region cluster from the current frame. In order to track objects while merged, the merge tracking stage 920 of the merge corresponder 900 is invoked given the merge cluster results from the previous frame merge corresponder operation and the region cluster from the current frame. The results returned from the merge corresponder 900 are then stored in the track. The merge corresponder 900 is explained in more detail hereinafter under the heading MERGE CORRESPONDER, in conjunction with FIGS. 17 and 18.

MODEL MATCHER

The model matcher 600 examines image information for region clusters (or simply regions) and determines which region clusters have a high likelihood of being an object to be tracked, such as a person. The basic principles of the model matcher 600 can be used to detect any type of object. In general, the model matcher generates at least one real-world feature for each region cluster, and then compares the at least one real-world feature for each region cluster with real-world feature model (statistical) information. As an example, the following describes parameters and procedures suitable for detecting whether a region cluster is a person in the scene.

The model matcher 600 described herein generates a confidence value for each region cluster region that implicitly represents the likelihood that the region cluster is a person. The model matcher 600 also provides the real-world location in X and Y grid coordinates of the person, as well as the real-world height and width of the person. Region clusters, their real-world position and size, and associated confidence value are then used for insertion into the OCG.

Figure 7:
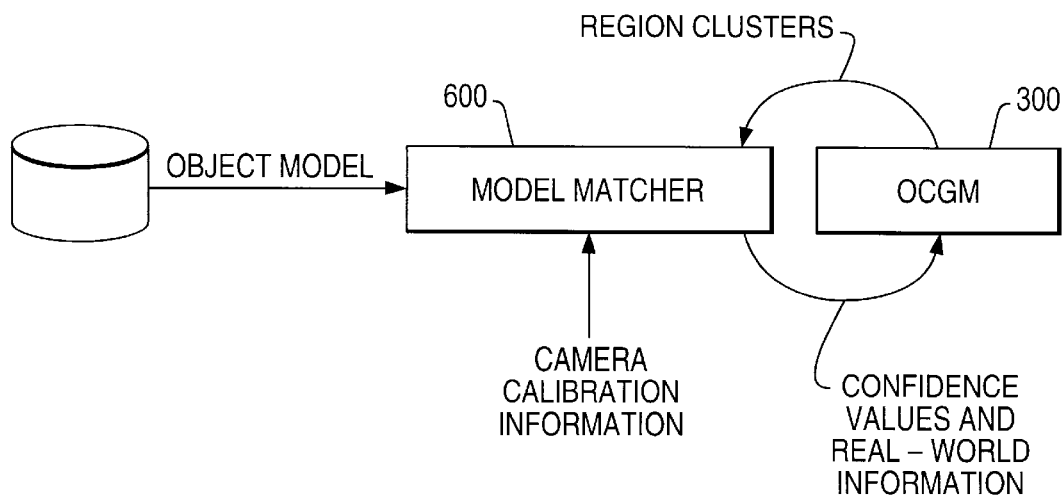
FIG. 7 is a block diagram for the model matcher forming a part of the tracking system according to the present invention.

With reference to FIG. 7, the model matcher 600 receives as input a set of region clusters from the OCGM 300, object model information or data, and camera calibration parameters for the current scene, including camera position and orientation information.

The camera calibration data includes:

1. The height of the camera above the floor, H.
2. The offset angle that the camera makes with the ceiling, where 0 degrees indicates that the camera is positioned parallel to the ceiling, and 90 degrees indicates that the camera is perpendicular to the ceiling, $\theta$.
3. The horizontal viewing angle through the lens, $\delta$.
4. The vertical viewing angle through the lens, $\alpha$.
5. The width of the image, in pixels, $I_w$.
6. The height of the image, in pixels, $I_h$.
7. The average ratio of a person's real-world width to their height, $\mu$.

The object model information or data, for a person as an example, includes:

1. Statistical information about the range of valid person heights.
2. Statistical information about the range of valid person widths.
3. Statistical information about the range of ratios of valid person heights to valid person widths.
4. A range of valid person positions.

Figure 8:
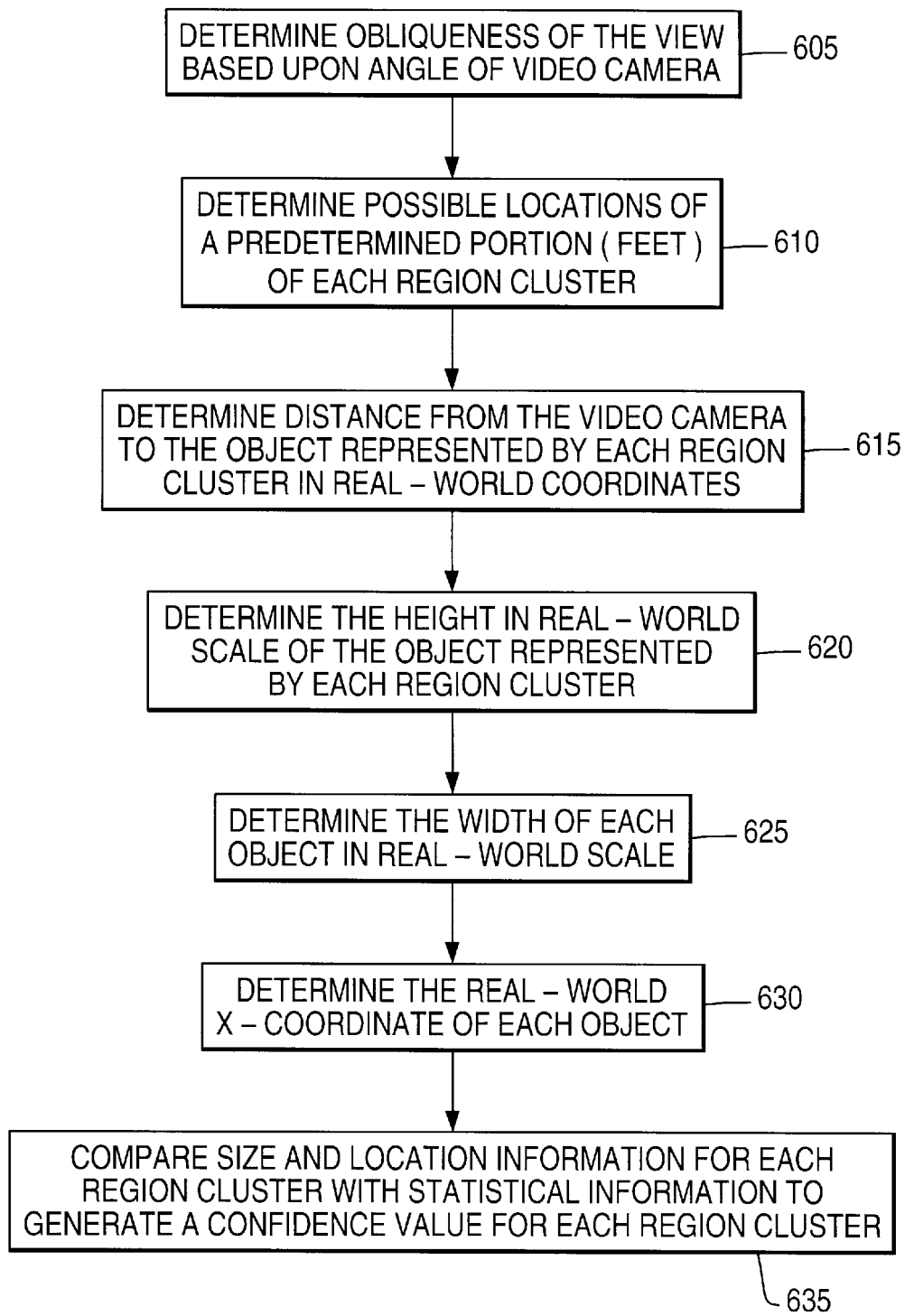
FIG. 8 is a flow chart depicting the operation of the model matcher.

Turning to FIG. 8, the operation of the model matcher 600 will be described. In step 605, the obliqueness of the viewing angle of the video scene is determined. If the angle, $\theta$, is less than approximately 70 degrees, then the view is considered oblique. Otherwise, the view is considered to be non-oblique, that is, downward-looking into the scene.

In step 610, the possible locations of a predetermined portion of the region cluster, such as feet of a person, are determined. In the case of person model matching, determination of the location of the feet determines whether the person is standing in the scene. This is performed by the following steps:

(a) If the camera view is oblique, the feet are assumed to be on the bottom of the region cluster.
(b) If the camera view is non oblique, the location of the region cluster relative to the center of the view is determined. Each region cluster can have one or two possible feet positions depending on the location of the region cluster relative to the center. If the region cluster is above the center of the view of the video camera, the feet are assumed to be on the bottom of the region cluster. If the region cluster is above and right of the center, the feet can either be at the bottom of the region cluster, or to the left of the region cluster. If the region cluster is below and to the left of the center, the feet can either be at the top of the region cluster, or on the left side of the region cluster. If the region cluster is within a given small radius of the center of the view, the feet are assumed to be at the centroid of the region cluster.
(c) Given the possible locations of the feet, the centroid of the region cluster is projected on the corresponding side of the oriented bounding box for the region cluster. The oriented bounding box will be described in greater detail under the heading REGION CORRESPONDER. For feet that lie at the centroid, this process is not performed. The resulting one or two projected points are the possible coordinates of the feet of the person, in image space.

Next, in step 615, the distance from the video camera to the object represented by each region cluster is determined, in real-world coordinates. This distance is called $Y_{real}$. The distance $Y_{real}$ is computed by the following steps:

(a) Calculating the distance from the image center to the Y location of the feet, called $C_0$.

(b) Assigning $C_h$, the value of the oriented bounding box height, which is perpendicular to the position of the feet.

(c) The angle between the top of the image and the feet is extracted using the formula: $\beta=\text{ARCTAN}((C_0*\text{TAN}(\alpha))/(0.5*I_h))$.

(d) If $\theta-\beta$ approaches 90 degrees, then the person is directly below the camera, and has a real world y location, $Y_{real}$, of 0 (distance, in inches, from the projection of the camera onto the floor to the position of the person's feet). Else, $Y_{real}=H/\text{Tan}(\theta-\beta)$.

In step 620, the real-world height of the object (person) corresponding to each region cluster is determined by the following steps:

(a) The angle between the person's head and feet is extracted using the formula: $\gamma=\text{ARCTAN}(((C_0+C_h)*\text{TAN}(\alpha))/(0.5*I_h))$ (b) If $\theta-\gamma$ approaches 90 degrees, then the real height, $H_{real}=|Y_{real}/\mu|$.

(c) Else, $H_{real}=(H-(Y_{real}*\text{TAN}(\theta-\gamma))/(\mu*\text{TAN}(\theta-\gamma))$.

In step 625, the width of each object in real-world scale is determined. This is achieved by the following steps:

(a) $C_w$ is assigned the value of the oriented bounding box width.

(b) The distance to the person's head from the camera is calculated: $D_H=\sqrt{Y_{real}^2+(H-H_{real})^2}$.

(c) $W_{real}=(D_H*C_w*\text{TAN}(\delta))/(0.5*I_w)$.

In step 630, the real-world X-coordinate of each object is determined by the following steps:

(a) The X distance from the center of the image to the person's feet are calculated in image coordinates. This is represented by $C_x$.

(b) $X_{real}=(D_H*(C_x+(0.5*C_w))*\text{TAN}(\delta))/(0.5*I_w)$.

Slight adjustments to the above equations for certain non-oblique views, such as "sign" changes for angles, may be necessary.

Figure 9:
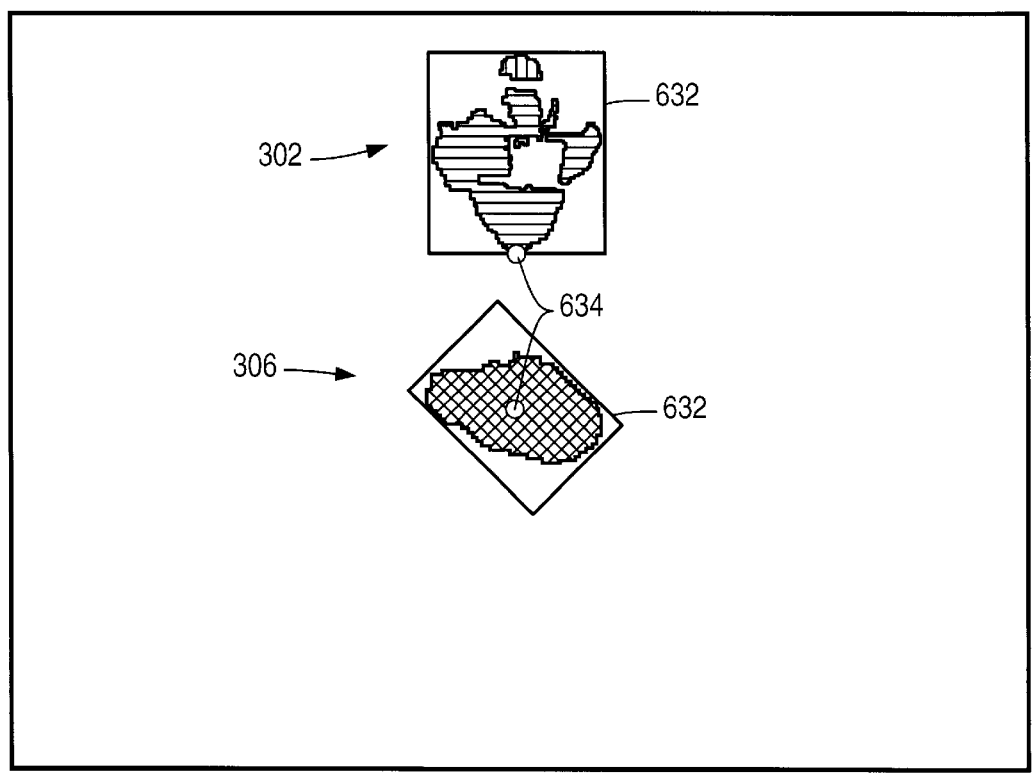
FIG. 9 is a pictorial diagram showing orientation result generated by the region corresponder and utilized by the model matcher for the region clusters of FIG. 6.

FIG. 9 shows the region clusters 302 and 306 and their oriented bounding boxes 632. In addition, the possible locations of the feet of each person corresponding to the region clusters are shown at reference numeral 634. In some cases there are multiple possible feet locations, and the feet location is either on the oriented bounding box or in the center of the region cluster.

Finally, in step 635, the size and location information determined in steps 605–630 for each region cluster is compared with statistical model information to generate a confidence value for each region cluster. This comparison process is repeated for each possible feet location for each region cluster and the location with the greater confidence is retained. There are several methods for comparing the statistical information with the computed information. One method is as follows:

(a) Minimum, maximum, mean, and standard deviation values for the following three real-world features are provided:
 (i) height;
 (ii) width;
 (iii) ratio of height to width.

(b) Minimum, maximum, mean, and standard deviation values for the region cluster density (the number of pixels in a region cluster/area in the oriented bounding box) are provided.

(c) If the calculated real-world location of the region cluster falls outside certain allowable locations then the region cluster is assigned a confidence value of 0, the lowest possible confidence value, and no further confidence value calculation is necessary.

(d) For a given region cluster, for each feature that falls within the minimum and maximum value, a fixed amount is added to the confidence value.

(e) For each feature, a Gaussian curve is constructed using the mean and standard deviation information. For a given region cluster, the feature value is mapped to a position on the axis, and the corresponding value on the curve is determined. This value is multiplied by a small constant and is added to the confidence value.

(f) The sum of the confidences values for the region cluster is normalized to a value between 0 and 1. Thus, the range of confidence values is from 0 to 1, with 1 being the highest confidence value.

The output of the model matcher 600 includes real-world X and Y coordinates for a region cluster, real-world heights and widths, a confidence value indicating whether the region cluster is a particular object, i.e., a person, and the location of a predetermined portion of the object, such as a person's feet in image coordinates. Another real-world features that is useful in person model matching skin color. Skin color may be useful alone, or in combination with size and location information of a region cluster.

REGION CORRESPONDER

Figure 10:
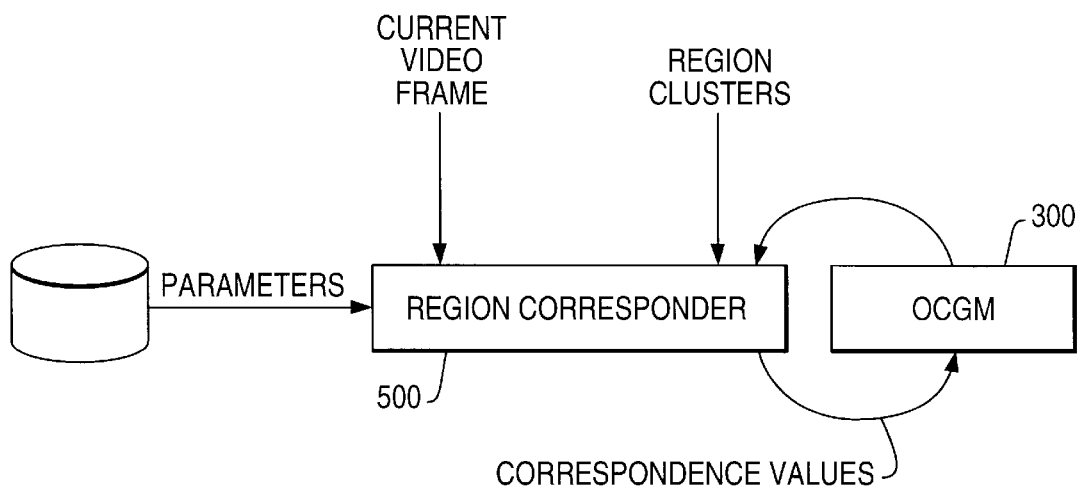
FIG. 10 is a block diagram of the region corresponder forming a part of the tracking system according to the present invention.

Turning now to FIG. 10, the region corresponder 500 will be described. The region corresponder 500 compares region clusters of a video frame with region clusters of a prior video frame. The region corresponder 500 utilizes region features to compare region clusters and generates a correspondence score for each comparison that represents the likelihood that two region clusters match. The correspondence score is used by the OCGM 300. In general, the region corresponder 500 generates at least one feature (described hereinafter) for each (a first and a second) region cluster to be compared, compares the at least one feature for the two region clusters, and generates a correspondence score representing a measure of correspondence between the first and second region cluster based upon the at least one feature for each of the first and second region clusters. The at least one feature may be a moment feature, contour feature or color region.

The inputs to the region corresponder 500 are the image information for the current video frame, the region clusters generated by the OCGM 300 for the current video frame, region clusters generated from the previous video frame, and predetermined parameters used for the correspondence methodology.

Figure 11:
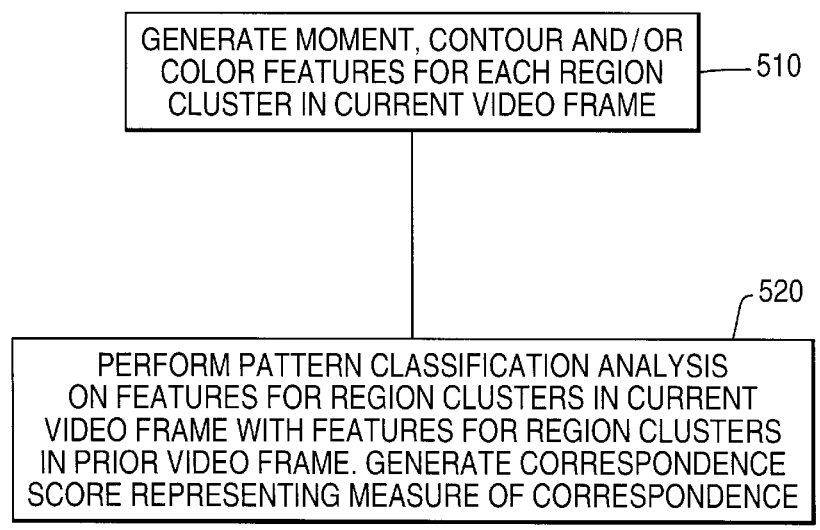
FIG. 11 is a flow chart depicting the operation of the region corresponder.

FIG. 11 illustrates the two basic steps performed by the region corresponder 500. The first step, 510, involves generating features for each region cluster, including moment features, contour features and color features. Then, in step 520, pattern classification analysis is performed on the features for region clusters in the current video frame and region clusters in the prior video frame in order to generate a correspondence score representing a measure of correspondence between region clusters.

The features extracted for each region cluster is one of three types: moment features, contour features and color features. Some of these features may have been extracted by the region segmenter 210 during image segmentation, and others may have been extracted by the model matcher 600. That is, the overhead for creation of the some of the features varies, and may be changed to accommodate certain efficiencies in particular applications. The features used for region correspondence are preferably single frame features.

The moment features are moment invariants, eccentricity (elongation), orientation, oriented bounding box, and area/position/bounding box/aspect ratios. The contour features include compactness, Fourier boundary descriptors and maximum chord length/perpendicular chord ratio. The color features include intensity features of the YUV image components.

Moment Features

Moment Invariants

Moment invariants are certain functions of moments which are invariant to geometric transformations such as translation, scaling, and rotation. The following definitions of moments which are invariant under translation are:

$$\mu(i, j) = \frac{1}{N} \sum_{x,y} (x - \bar{x})^i (y - \bar{y})^j$$

Experiments have shown that the following types of moments are effective features in a region correspondence algorithm:

$$\mu(1, 1) = \frac{1}{N} \sum_{x,y} (x - \bar{x})(y - \bar{y})$$

$$\mu(2, 0) = \frac{1}{N} \sum_{x} (x - \bar{x})^2$$

$$\mu(0, 2) = \frac{1}{N} \sum_{y} (y - \bar{y})^2$$

Feature $\mu(2,0)$ is a measure of variance of the pixel distribution in the horizontal direction, Similarly, feature $\mu(0,2)$ is a measure of variance of the pixel distribution in the vertical direction. Feature $\mu(1,1)$ represents the covariance of the pixel distribution and contains information about the diagonal distribution of pixels. The square root of these moments are used in computing feature distances.

Eccentricity (Elongation)

There are several measures of elongation for a given region. The following form is used, which is also called the principle axis of inertia:

$$e = \frac{[\mu(0, 2) - \mu(0, 2)]^2 + 4\mu(1, 1)}{Area}$$

An advantage of this feature is its low computational complexity because it can be determined from pre-computed moments and area values.

Orientation

Orientation is a measure of distribution of region pixels in different directions. The orientation is found by determining the eigen values of the covariance matrix for the region. The covariance matrix is defined as:

$$\begin{bmatrix} \mu(2, 0) & \mu(1, 1) \\ \mu(1, 1) & \mu(0, 2) \end{bmatrix}$$

Once the two eigen values, e1 and e2 are found, the corresponding eigen vectors v1 and v2 are extracted. The eigen vector corresponding to the larger of the two eigen values is the principal axis of the region, and its angle of orientation is the orientation of the region. The eigen vector corresponding to the smaller of the two eigen values is the secondary axis of the region, which is perpendicular to the principal axis.

Oriented Bounding Box

The oriented bounding box is the bounding box of the region that is aligned with the principal axis of the region, as calculated through the orientation. FIG. 9 shows an example of an oriented bounding box, at reference numeral 632. The oriented bounding box is found by:

1. For each row of pixels in the region:
    a) Find the endpoints of the row.
    b) Project the endpoints onto the principal axis.
    c) Project the endpoints onto the secondary axis.
2. Determine the two projected points that are the minimum and maximum values on the principal axis.
3. Determine the two projected points that are the minimum and maximum values of the secondary axis.
4. Construct a rectangle by intersecting
    a) a line parallel to the principal axis that passes through the minimum projected value on the secondary axis;
    b) a line parallel to the principal axis that passes through the maximum projected value on the secondary axis;
    c) a line parallel to the secondary axis that passes through the minimum projected value on the principal axis;
    d) a line parallel to the secondary axis that passes through the maximum projected value on the principal axis.

This rectangle is the oriented bounding box.

Area, position, aspect ratio

Features such as area, position, and aspect ratio (ratio of the short edge to the long edge of the oriented bounding box) of the oriented bounding box do not demand high computational resources. These features can be used for an initial estimation of correspondence between two regions.

Contour Features

Fourier Boundary Descriptors

Each point on the boundary of a region can be represented by a complex number u(n)=x(n)+jy(n). For a closed boundary, u(n) is periodic with period Q. The Discrete Fourier Transform (DFT) of the sequence u(n) is given by $$U(k) = \sum_{n=0}^{Q-1} u(n) e^{-j\frac{2\pi k n}{Q}} \quad 0 \leq k \leq Q - 1$$

The complex coefficients U(k) are called the Fourier Descriptors (FDs) of the boundary and are used for matching the boundary of similar shapes. The advantage of the Fourier Descriptor is that it can provide a distance measure that is invariant under translation, scaling, and rotation. To measure the FD distance between two regions R and R' with boundaries u(n) and v(n), the following function is used:

$$d(u_0, \alpha, \theta_0, n_0) = \min_{u_0, \alpha, \theta_0, n_0} \left\{ \sum_{n=0}^{Q-1} |u(n) - \alpha v(n + n_0) e^{j\theta_0} - u_0|^2 \right\}$$

The shapes of R and R' are similar if the distance $d(u_0, \alpha, \theta_0, n_0)$ is small. Parameters $u_0, n_0, \alpha$, and $\theta_0$ are chosen to minimize the effects of translation, scaling, starting point, and rotation, respectively. When the available computational power is restricted, less complex distance measures based on FD can be used.

Compactness

Compactness is defined as $$\rho = \frac{(\text{perimeter})^2}{4\pi \times \text{Area}}$$

For a disc-shaped region this parameter takes a value of 1. As the region becomes more non-regular, compactness takes on larger values.

Ratio of Maximum Chord Length to Perpendicular Chord

The ratio of the length of a maximum chord of a region cluster to a chord perpendicular to it is a useful contour matching parameter.

Color Features

Color is one of the effective features in measuring the degree of correspondence between two objects. This is particularly true if objects are located in far frame distances where other features such as moment-based features loose their matching effectiveness. Color features represent the distribution of color and luminance components inside a region. In a YUV color coordinate system, histogram components $h_Y(n), h_U(n),$ and $h_V(n)$ represent the Y, U, and V distribution of pixel values in a given region. A simple form of color features is computed by smoothing $h_Y(n), h_U(n),$ and $h_V(n)$ and finding the intensity values $f_Y, f_U,$ and $f_V$ that maximize these functions.

$$f_Y = \underset{p}{\operatorname{argmax}} h_y(n)$$

$$f_U = \underset{n}{\operatorname{argmax}} h_u(n)$$

$$f_V = \underset{o}{\operatorname{argmax}} h_v(n)$$

In a single mode color matching approach, only the argmax of the color histograms is extracted as the dominant color feature of an objects. This method ignores the remaining color content of objects. Most of the time, objects such as moving people in a scene, have more than one strong color component. For example, a person with blue shirt and white pants has a bimodal histogram. If the sizes of the white and blue areas are comparable, it is possible to have a significant shift in the argmax of the color histograms from one frame to the next one. In order to avoid this oversensitivity, one can locate the other modes of the color histogram and use a collective set of histogram features to measure the correspondence between two objects.

A natural solution to the mode extraction problem is the use of a clustering algorithm such as k-means or isodata. The problem with these methods is their computational complexity since they iteratively visit the histogram values before converging to a final solution. Also clustering algorithms tend to average nearby modes and provide inaccurate indications of the peak locations.

The approach described herein for the mode-extraction is less expensive than clustering algorithms and leads to more accurate indications of the peak locations. The following stages are used in order to extract the histogram peaks.

1. Filter the histogram with a moving average filter such that the local jitters are smoothed. Assuming that h is the input, f is the output, and w is the support of the filter, the moving average filtering operation can be expressed as $$f(n) = \frac{1}{L} \sum_{i \in w} h(n-i).$$

The typical mask size of this filter is 9 to 11 points. In order to reduce the complexity of the long moving average filter used for smoothing the color histograms and its derivatives, a FIFO implementation is deployed. In this implementation a running sum of samples is computed by adding a new sample value and subtracting the oldest sample value in the buffer. With this method, the complexity of filter is reduced from LN to 2N where L is the size of the filter mask and N is the number of data samples.

2. Take the scaled derivative of the smoothed histogram by computing the difference between the histogram values at the previous and next indexes. This operation is described in the following expression.

$$f'(i) = f(i+1) - f(i-1)$$

3. Filter the scaled derivative with a moving average filter. The typical mask size of this filter is about 7 to 9 points.
4. Find the zero crossing of the filtered version of the scaled derivative by looking for adjacent sign changes of this function.
5. Select zero crossings corresponding to peak locations.
6. Compute peak confidences by taking the difference of the histogram values at previous and next zero crossings.
7. The histogram modes are those peaks with confidences that exceed a predefined threshold.

Classification Methodology

The classification step 520 is based on pattern recognition techniques. Given two regions R and R', the region correspondence algorithm measures the degree of similarity between the two regions by computing a distance function D(R, R') from N features $f_1, f_2, \ldots, f_n$ associated with each of the regions. The distance between the $i^{th}$ feature of R and the $i^{th}$ feature of R' is represented by $d_i(R, R')$. The distance value $d_i(R,R')$ shows how the $f_i$ feature of R differs from the same feature of R'.

In a pattern classification formulation, the classification algorithm classifies the relationship between the two regions into "regions correspond" or "regions do not correspond" classes. With this formulation the N different feature distances are the coordinates of an N-dimensional feature space and use a pattern classification algorithm with a discrimination function D.

A trainable pattern classifier is used which iteratively trains the parameters of D from a training set of patterns. This training set is generated by ground-truthing a set of segmented test sequences. The choice of function D has a significant impact on the accuracy of the correspondence process. A simple approach is to use a linear discriminant function of the following form:

$$D(d_1, d_2, \ldots, d_N) = \sum_{i=1}^{N} w_i d_i$$

While this linear classifier is suitable for separable pattern classes, it does not yield the best results in the general non-separable case. To achieve more robust decision boundaries, a quadratic nonlinear classifier of the following form can be used:

$$D(d_1, d_2, \ldots, d_N) = \sum_{j=1}^{N} w_{jj} d_j^2 + \sum_{j=1}^{N-1} \sum_{k=j+1}^{N} w_{jk} d_j d_k + \sum_{j=1}^{N} w_j d_j$$

To determine coefficients $w_{ij}$, an associative unit of intermediate variable $s_k$ is defined such that $$d_i d_j = s_k \text{ where } k=i+j$$

Then $D(d_1, d_2, \ldots, d_n)$ which is a nonlinear function of $d_i$ variables, becomes a linear function of $s_k$ variables with the same weighting coefficients $w_k = w_{ij}$ where $k=i+j$. Thus, $$D(s_1, s_2, \ldots, s_N) = \sum_{k=1}^{M} w_k s_k$$

$$M = \frac{(n+1)(n+2)}{2}$$

With this transformation, the classification procedure has been effectively transformed to a linear representation. Although the decision function D can be considered as linear in the M-dimensional space, it retains its general nonlinear properties in the N-dimensional space of the original distance patterns.

Training Methodology

In order to compute the weighting parameters $w_{ij}$, a training process that is based on a Baysian classification methodology with a multi-dimensional Gaussian distribution model.

The first stage in the training process is to remove all possible redundancies from the training data. One source of these redundancies is created by the current version of the ground-truthing tool which generates multiple copies of the training data points. After the redundancies are removed, the features are normalized by their maximum values in the training data set such that their values fall in the interval [0,1]. In the next stage, the normalized training data is analyzed to extract its first and second order statistical parameters. To perform this analysis, the training data is partitioned into two sets of data points $S_c$ and $S_{nc}$. $S_c$ is the set of data points whose cluster pair were matched from one frame to the next in the ground-truthing process. Similarly, $S_{nc}$ corresponds to the set of cluster pairs which did not match in the ground-truthing process. After the statistical analysis the following parameters are generated:

$m_c$: The mean vector of the set $S_c$.
$m_{nc}$: The mean vector of the set $S_{nc}$.
$m_d$: The mean difference vector.

$$m_d = m_c - m_{nc}$$

$C_c$: The covariance matrix of the set $S_c$.
$C_{nc}$: The covariance matrix of the set $S_{nc}$.
C: The average covariance matrix.

$$C = \frac{1}{2}(C_c + C_{nc})$$

$C^{-1}$: Inverse of the average covariance matrix.
$P_c$: A priory probability of the correspondence class. This parameter is computed by counting the number of correspondence instances in the ground-truthed data.
$P_{nc}$: A priory probability of the non-correspondence class. This parameter is computed by counting the number of non-correspondence instances in the ground-truthed data.

The weight vector w is computed as $$w = C^{-1} m_d.$$

The constant threshold $w_0$ is computed as $$w_0 = \frac{\left(\ln\left(\frac{P_c}{P_{nc}}\right) - 0.5\right)}{m_d^T C^{-1} m_d} w^T m_d.$$

Given the weighting vector w and constant $w_0$, the runtime tracking system can check the sign of the following decision function to decide on the correspondence between two clusters.

$$\sum_{i=1}^{N} w_i d_i + w_0.$$

In order to normalize the correspondence score this function is normalized by the maximum correspondence score and the minimum non-correspondence score such that the result is within the range of −1.0 to 1.0

The region corresponder 500 outputs correspondence scores between region clusters of consecutive frames which are added as information to the OCG, as well as updated and additional region descriptors for the region clusters. Correspondence scores which are less than 0 will cause the OCGM 300 not to link a new node to an existing node, whereas all other correspondence scores will cause a link to be added and considered for further processing by the OCGM 300.

Figure 12:
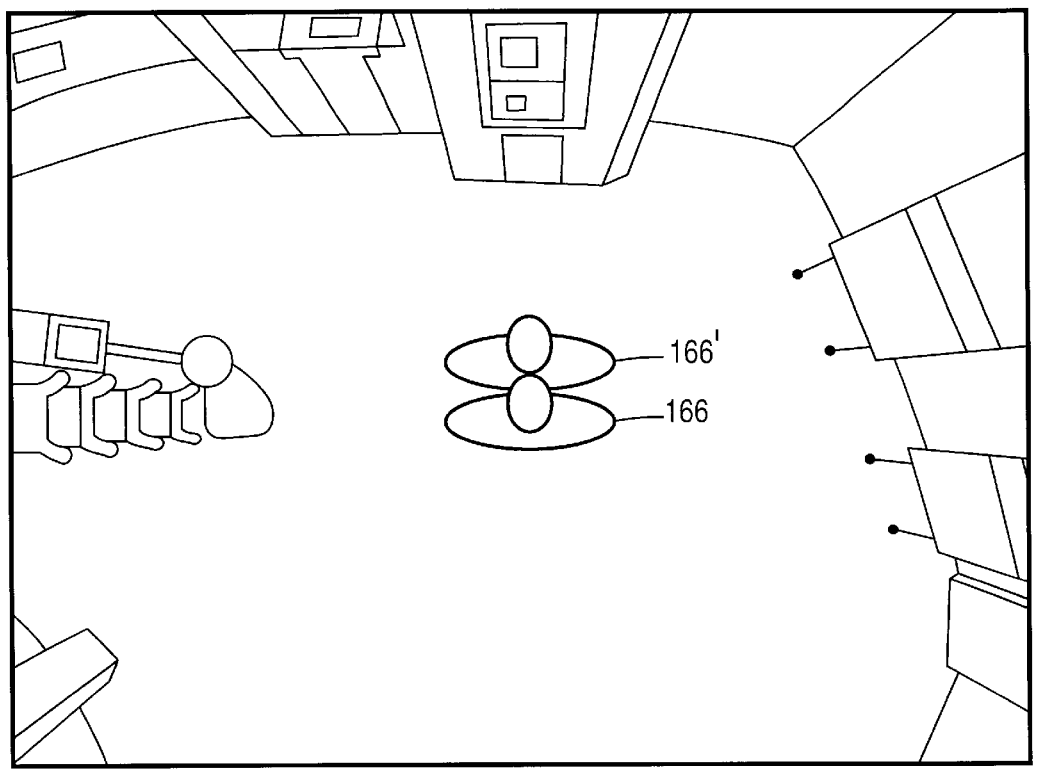
FIGS. 12 and 13 are diagrams showing the operation of the region corresponder for one person object in the scene.
Figure 13:
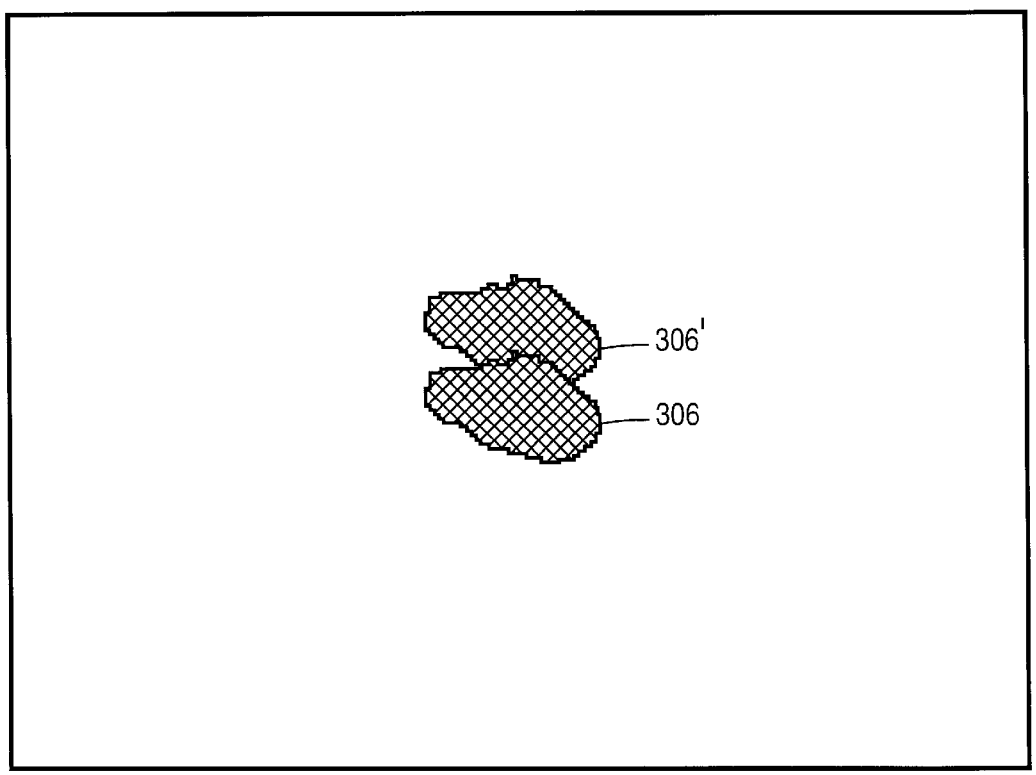

To illustrate the operation of the region corresponder 500, reference is made to FIGS. 12 and 13. FIG. 12 illustrates the image for person object 166 and person object 166' in consecutive video frames. The region cluster corresponding to the person objects 166 and 166' are shown at reference numerals 306 and 306' in FIG. 13.

Set forth below is a list of distances for the various features and a resulting correspondence score between region clusters 306 and 306'. The correspondence value between region clusters 306 and 306' would be 1.0.

TRAJECTORY GENERATOR

Figure 14:
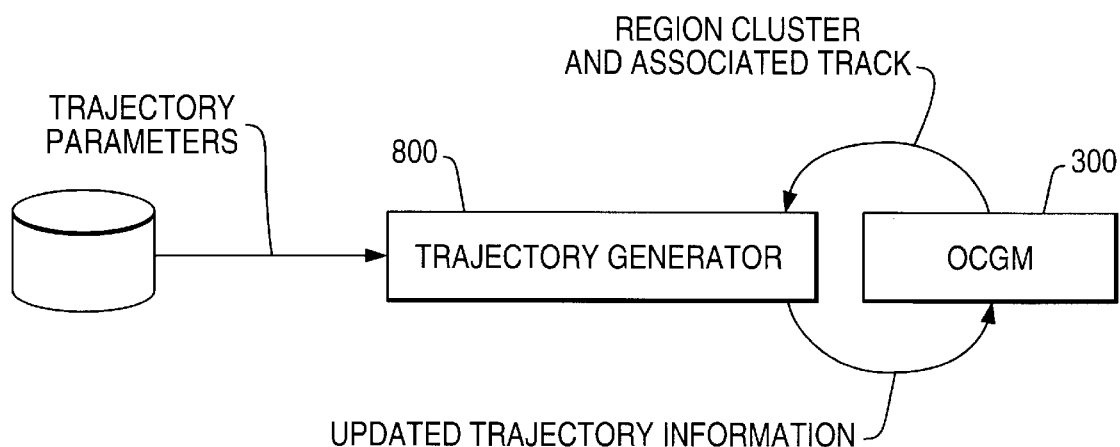
FIG. 14 is a block diagram of the trajectory generator forming a part of the tracking system according to the present invention.

The trajectory generator 800 is described with reference to FIG. 14. The trajectory generator 800 generates information about the trajectory for a track on the OCG and is invoked in step 335 (FIG. 4A) by the OCGM 300.

The trajectory generator 800 determines trajectory information for a track in a given frame, based on the most recent node (region cluster) for the track in that frame. The trajectory parameters include at least one at:

1. Current velocity of the region cluster.
2. Current acceleration.
3. Maximum velocity over the course of the trajectory.
4. Maximum acceleration over the course of the trajectory.
5. Validity of the trajectory.
6. The current mass of the region cluster.

This information is maintained in a data structure for the track by the OCGM 300. A history of trajectory information for each frame in which the track exists is thereby created.

The current velocity is computed by dividing the distance from the centers of mass of the region cluster in the two most recent frames of the track by the difference in time between frames. The current acceleration is computed by dividing the difference in velocities over the three most recent frames, by the corresponding time between the three frames.

The status of the trajectory of a track is based upon the trajectory parameters. The trajectory status takes on one of several possible states: Invalid Mass; Invalid Acceleration; Invalid Velocity; and Valid.

Invalid Length is assigned to a track that has less than three nodes, which means that the acceleration could not be computed. This value is also assigned if any of the last three nodes had a status of Invalid Velocity, Invalid Acceleration, or Invalid Mass.

Invalid Mass is assigned to a track if there is a significant difference between the current mass of the region cluster and the mass of the region cluster in the previous frame. This indicates that a reliable velocity cannot be computed because the mass has been radically altered. The percent difference allowed is a predetermined trajectory parameter. The current mass is the number of pixels in the region cluster.

Invalid velocity is assigned to a track that has exceeded a maximum velocity allowed for the scene, set by a predetermined trajectory parameter.

Invalid acceleration is assigned to a track that has exceeded a maximum acceleration allowed for the scene, set by a predetermined trajectory parameter.

A Valid trajectory status is assigned to a track if none of the trajectory parameters are determined to be invalid, that is, not within predetermined acceptable limits.

The output of the trajectory generator includes the current velocity of the region cluster, the current acceleration of the region cluster, the maximum velocity of the region cluster over its entire track, the maximum acceleration of the region cluster over its entire track and the validity of the track as of the current video frame.

SPLIT/MERGE RESOLVER

Figure 15:
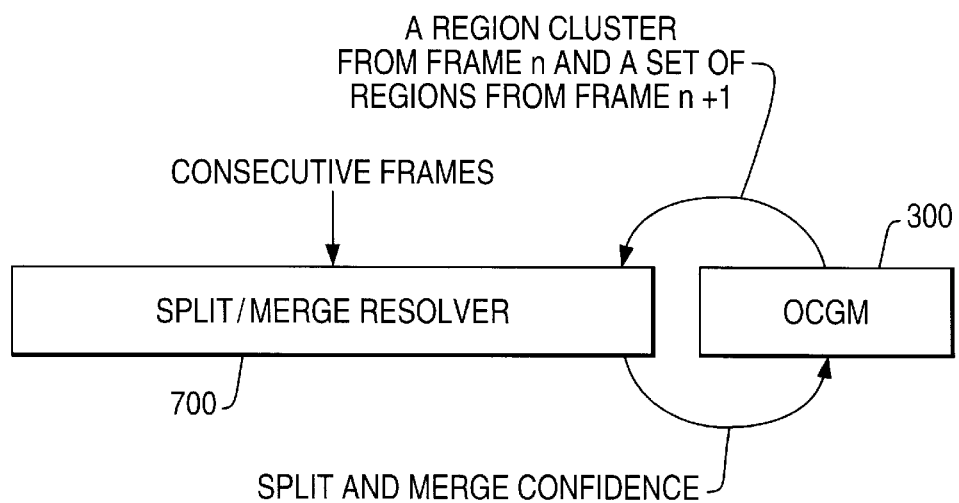
FIG. 15 is a block diagram of the split/merge resolver forming a part of the tracking system according to the present invention.
Figure 16:
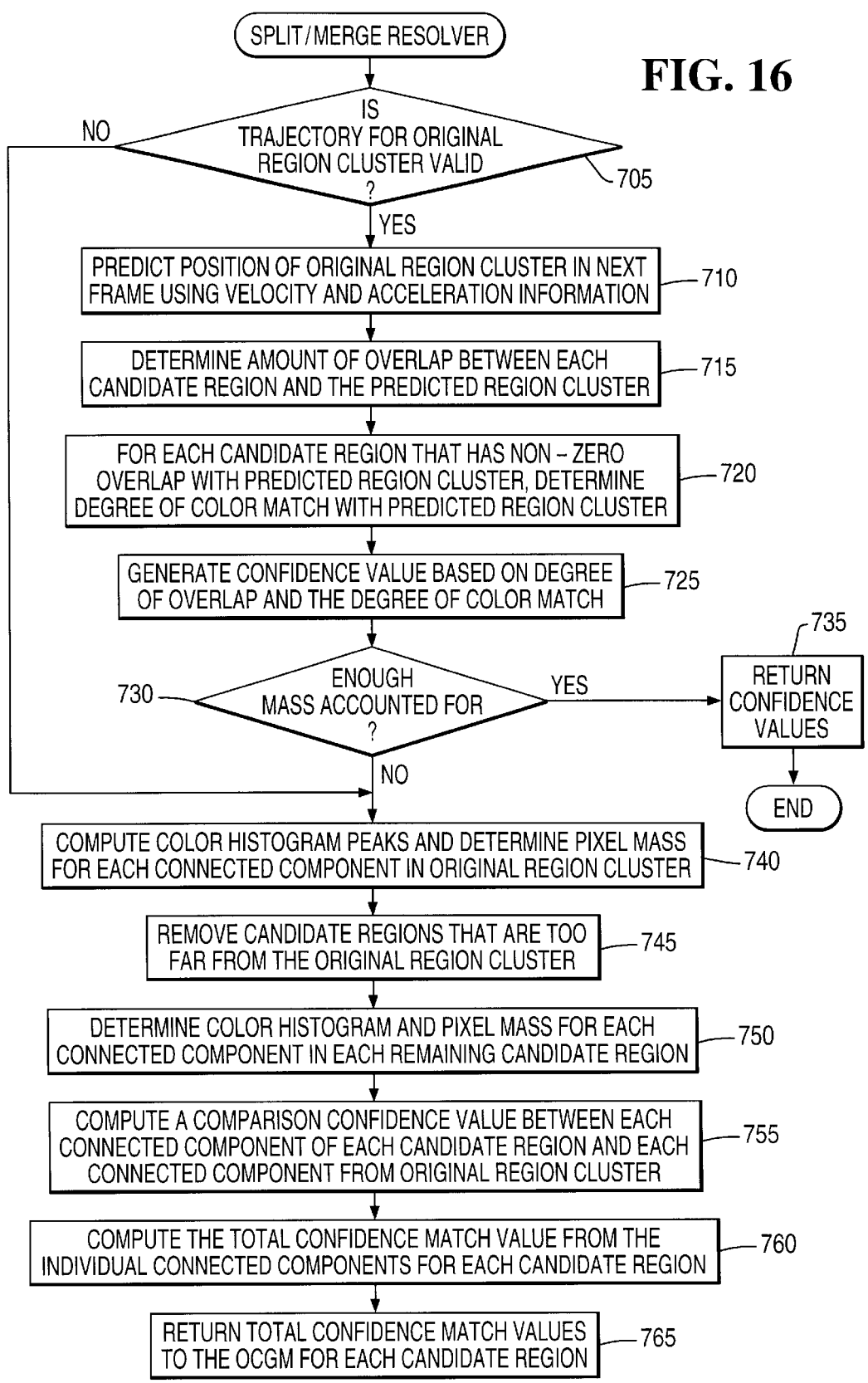
FIG. 16 is a flow chart depicting the operation of the split/merge resolver.

The split/merge resolver 700 is described in conjunct ion with FIGS. 15 and 16. The split/merge resolver 700 is invoked in step 335 and step 360 by the OCGM 300 to track region clusters through merges and splits of OCG objects, when it was not possible to match an object node to a track based on information generated by the region corresponder 500. This generally occurs when a region cluster has undergone a radical change in feature characteristics such as size or shape, which often occurs when the original region cluster has split into several smaller regions, or when the original region cluster merges with another region cluster.

The split/merge resolver 700 applies a different set of mechanisms than the region corresponder 500 for determining the confidences between the original region cluster and candidates, and is better suited for resolving split and merge situations. Among the set of techniques applied by the split/merge resolver 700 are trajectory following and prediction, mass preservation, color matching and position overlap.

The split/merge resolver 700 operates on regions from two consecutive frames. It receives as input a region cluster, called the original region cluster from a first frame (frame n), the trajectory of the original region cluster, a set of regions called candidate regions from the next frame (frame n+1), the color image for frame n and the color image for frame n+1. It is the responsibility of the split/merge resolver to generate confidence values for each candidate region in frame n+1, where the confidence value indicates the likelihood that the candidate region came from the original region cluster in the previous frame.

Trajectory following and prediction means that if a region cluster has been following a smooth, continuous track, then it is likely to continue following this track. Therefore, candidate regions that are more likely to have been generated from the original region cluster are located in positions that follow the original region cluster's trajectory.

Mass preservation is the concept that the size of a person, in pixels, generally changes little from frame to frame. This concept is applied by the split/merge resolver 700 by looking for enough candidate regions to make up a large proportion of the mass of the original region cluster.

Color matching is the concept that the color of individual regions in the original region cluster generally does not change much from frame to frame. Therefore, a good method of matching regions between frames involves detecting similarities in color between regions.

Position overlap is the concept that region clusters may not move much in the scene from frame to frame. Therefore, a good matching region clusters between frames involves computing the number of pixels in each region cluster that have the same position in both frames.

With reference to FIG. 16, the operation of the split/merge resolver 700 will be described. In step 705, it is determined whether the trajectory for the original region cluster exists and is valid. If the trajectory of the original region cluster exists and is valid, then in step 710, the position of the original region cluster in the next frame is predicted using velocity and acceleration information generated by the trajectory generator 800. The original region cluster is shifted to this predicted position, and this shifted region cluster is called the predicted region cluster.

Then, in step 715, the amount of overlap between each candidate region cluster and the predicted region cluster is determined.

In step 720, for each candidate region that is determined to have some overlap (non-zero overlap) with the predicted region cluster, the degree of color match with the predicted region cluster is determined. The degree of color match is determined by one of several methods known in the art. For example, the color histogram peaks are compared for the areas of overlap between the predicted region cluster and the candidate region cluster. The closer the peaks of the histograms, the better the match. Alternatively, the color difference in gray levels is added for each overlapping pixel between the predicted region cluster and the candidate region cluster. The smaller the sum, the better the match between the two region clusters.

Next, in step 725, a confidence value is generated for each candidate region cluster determined to have non-zero overlap with the predicted region cluster. The confidence value is based upon the degree of overlap and the degree of color matching. It is possible also that two confidence values are generated, one for the degree of overlap and one for the degree of color matching.

In step 730, it is determined whether the overlapping mass of the predicted region cluster is sufficiently large compared to the original region cluster. That is, it is determined whether the candidate region clusters that have non-zero overlap with the original region cluster and have confidences that exceed a predetermined threshold have a sufficient amount of overlap to make up a large portion of the original region cluster.

In step 735, if sufficient mass of the original region cluster has been accounted for, then the confidence values for each of the candidate region clusters (which have non-zero overlap with the original region cluster) are returned.

Otherwise, in step 740, if a sufficient mass of the original region cluster has not been accounted for the candidate region clusters determined to have non-zero overlap or the trajectory of the original region cluster is determined to be invalid in step 705, then in step 740, the candidate region clusters that do not overlap with the predicted region cluster are closely examined. The color histogram peaks and pixel mass is determined for each connected component of the original region cluster, where each region cluster is made up of one or more regions and each region is made up of one or more connected components. A connected component is one of the elements of a highly confidence region set for a particular region, as described in the co-pending application entitled "System and Method for Segmenting Image Regions From a Scene Likely to Represent Particular Objects in the Scene."

In step 745, the set of possible candidate region clusters is reduced by removing candidate region clusters that are too far away from the predicted region cluster, that is, they could not be reached by the original region cluster based on maximum velocities and accelerations possible for the types of objects, such as person, which are tracked.

In step 750, for the remaining candidate region clusters, the color histogram peaks and pixel mass is determined for each connected component of the region cluster.

In step 755, each connected component of the original region cluster is compared with each connected component for each candidate region cluster. Specifically, a confidence value is generated based upon the closeness of the histogram peaks; the similarity in mass; and/or the ratio of the connected component mass to the total mass of the region cluster.

In step 760, the confidence values for every connected component in the region cluster are combined (by addition, selecting a maximum value, or some other method) to form the final confidence for the region cluster.

If at least one candidate region cluster has a confidence that exceeds a predetermined threshold, then in step 765, the confidence values generated for each candidate region cluster in step 760 are returned to the OCGM 300. These confidence values are then used by the OCGM 300 to determine the links between nodes in frames n and n+1.

If no candidate region cluster has a sufficient confidence, then the position overlap method is executed. The confidence score for each candidate region cluster is initialized. The location of each pixel in the original region cluster (from frame n) is examined in frame n+1. If a candidate region cluster contains a pixel at that location, then the confidence of that candidate region cluster is increased. This is repeated for each pixel in the original region cluster.

The final confidence for each candidate region cluster is obtained by scaling its current confidence score by the minimum of the total number of pixels in the original region cluster and the candidate region cluster. These confidence values are returned to the OCGM 300 and are then used by the OCGM 300 to determine the links between nodes in frames n and n+1.

MERGE CORRESPONDER

Figure 17:
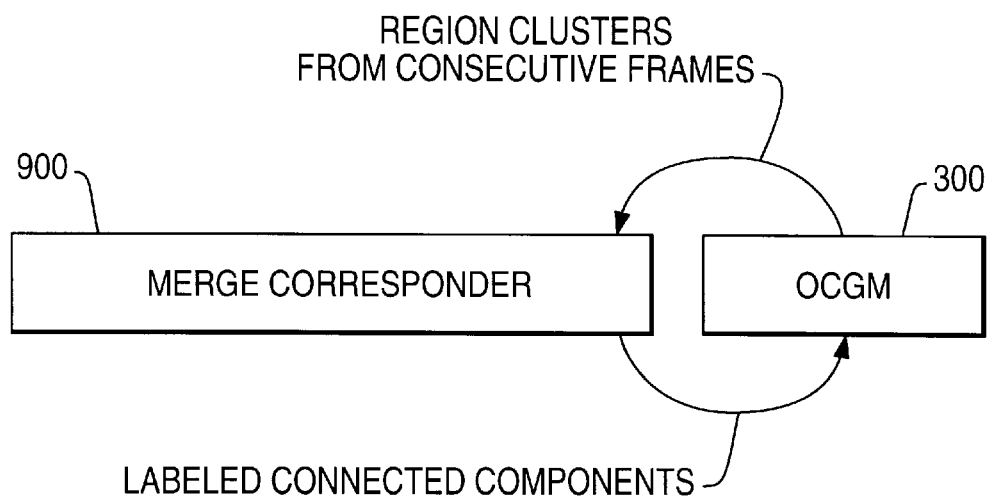
FIG. 17 is a block diagram of the merge corresponder forming a part of the tracking system according to the present invention.
Figure 18:
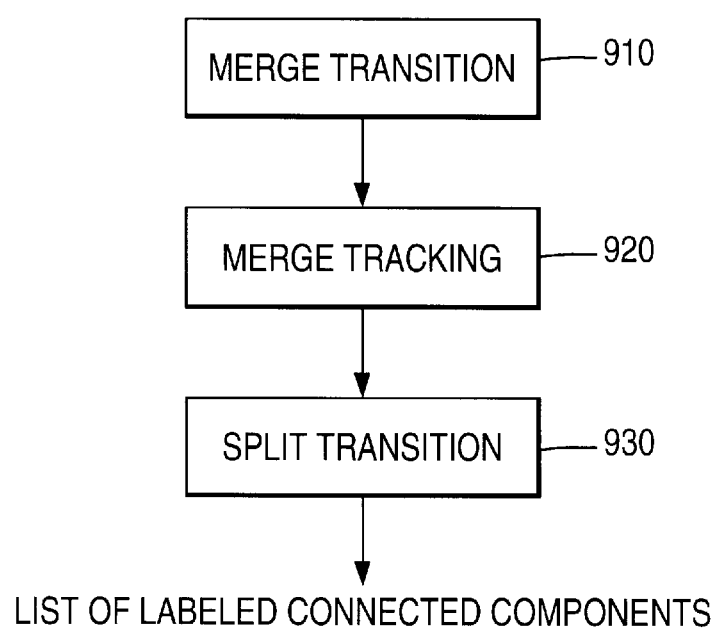
FIG. 18 is a flow chart depicting the operation of the merge corresponder.

Referring to FIGS. 17 and 18, the merge corresponder will be described. The merge corresponder 900 operates when two or more objects merge in a scene to form a single region cluster. Generally, it is difficult to track individual objects once a merge has occurred. The merge corresponder 900 tracks objects through the merge condition by extracting more detailed features from the objects before, during, and after the merge. The advantage of tracking through a merge condition is that it leads to more reliable tracks than dropping the tracks at the merge and later reassembling them after the merge.

The merge corresponder 900 has three stages of operation: a merge transition stage 910, a merge tracking stage 920, and a split transition stage 930. Merge transition occurs during the two image frames in which the objects initially merge. Merge tracking occurs in all frames in which the merge continues. Split transition occurs in the two image frames when the objects once again split into individual region clusters.

During the merge transition stage 910, the merge corresponder 900 receives as input:

1. A set of region clusters, called the initial region clusters, each corresponding to a person in frame n.
2. The color image from frame n.
3. The merged region cluster from frame n+1.
4. The color image from frame n+1.

In the merge transition stage 910, the following steps are performed.

1) Each initial region cluster for frame n is resegmented with a stricter threshold to generate a larger set of connected components for that region cluster.
2) The merged region cluster from frame n+1 is resegmented in a similar fashion.
3) An enhanced set of features, such as color histogram peaks, are extracted for each connected component in both the initial region cluster set and the merged region cluster.
4) Each connected component from the initial region cluster set is matched to one or more connected component(s) in the merged region cluster based on similarity of features. A confidence value is generated for each match that is a function of the simplicity of the match.
5) The connected components in the merged region cluster are assigned labels indicating which initial region cluster they most closely match.
6) The feature enhanced connected components, their assigned labels and confidences are returned.

The outputs of the merge transition stage 910 are:

1. A label for each connected component in the merged region cluster, where the label indicates to which region cluster the connected component belongs.
2. A confidence value for each connected component in the merged region cluster, where the confidence value indicates the likelihood that the label for the merged region cluster has been correctly assigned.
3. An enhanced set of features for each connected component, that will be used in subsequent stages of the merge corresponder.

In the merge tracking stage 920, the merge corresponder 900 receives as input the output of the merge transition stage as well as the merged region cluster from frame n+2 and the color image from frame n+2. The merge corresponder may also receive as input additional region clusters from frame n+1. These additional region clusters are those that have merged with the existing merged region cluster in frame n+2. During the merge tracking stage 920, the following steps are performed.

1) Each additional region cluster for frame n+1 is resegmented with a stricter threshold to generate a larger set of connected components for that additional region cluster.

2) An enhanced set of features, such as color histogram peaks, are extracted for each connected component in the additional region cluster set.
3) The merged region cluster from frame n+2 is resegmented with a stricter threshold to generate a larger set of connected components for that region cluster.
4) An enhanced set of features, such as color histogram peaks, for each connected component in the merged region cluster from frame n+2.
5) Each connected component from the merged region cluster from frame n+1 and the additional region cluster set is matched to one or more connected component in the merged region cluster from frame n+2 based on similarity of features.
6) The connected components in the merged region cluster from frame n+2 are assigned labels indicating which region cluster they most closely match, based on the labels from frame n+1. A confidence value is generated for each match that is a function of the similarity of the match.
7) The feature enhanced connected components from frame n+2 and their assigned labels are returned.

The outputs of the merge tracking stage are:
1. A label for each connected component in the merged region cluster from frame n+2, where the label indicates to which region cluster the connected component belongs.
2. A confidence value for each connected component in the merged region cluster from frame n+2, where the confidence value indicates the likelihood that the label for the merged region cluster has been correctly assigned.
3. An enhanced set of features for each connected component from frame n+2, that will is used in subsequent stages of the merge corresponder 900.

Merge tracking is repeated frame after frame until a region cluster split has been detected. Once a split has been detected, the split transition stage 930 is executed.

In split transition stage 930, the merge corresponder 900 receives the following input.
1. A label for each connected component in the merged region cluster from frame n+m, where the label indicates to which region cluster the connected component belongs.
2. An enhanced set of features for each connected component from frame n+m.
3. The set of one or more final region clusters from frame n+m+1.
4. The color image from frame n+m+1.

In the split transition stage 930, the following steps are performed.
1) Each region cluster in the set of final region clusters is resegmented with a stricter threshold to generate a larger set of connected components for that region cluster.
2) An enhanced set of features is extracted from each connected component in the set of final region clusters.
3) Each connected components from the merged region cluster from frame n+m is matched to one or more connected component in the set of final region clusters based on similarity of features. A confidence value is generated for each match that is a function of the similarity of the match.
4) The connected components in the set of final region clusters are assigned labels indicating which region clusters they most closely match, based on the labels from frame n+1.
5) A set of labels is ascertained for each final region cluster based upon the labels of its connected components. A confidence is assigned to each label based upon the confidence of labels of the connected components, as well as the mass of the connected components.
6) A single label is assigned to each final region cluster. This single label is the label which contains the maximum confidence from the set of labels. However, if the confidence of the maximum label does not exceed a predetermined threshold, the label "unknown" is assigned.
7) The assigned label for each final region cluster is returned.

The output of the split transition stage 930, and thus the output of the merge corresponder 900, is a label for each final region cluster, and a confidence for that label.

TRACK CORRESPONDENCE GRAPH MANAGER

The TCGM 400 manages the accumulation of OCG track segments over time in the track correspondence graph (TCG).

Referring back to FIG. 3, the TCG is shown at reference numeral 410. The TCG 410 is a list of tree data structures, shown at reference numeral 416, that contain track information about one or more objects. A TCG node, shown at reference numeral 412 in FIG. 3, contains information that describes some portion, or all, of an object's path through the camera view. Each TCG node references one or more OCG tracks that represent some portion of an object's track through the scene. OCG tracks are stored in an ordered list in a TCG node. The ordered list of OCG tracks contain path and feature information with respect to the object as it moves through the scene. In some instances, one TCG node maintains all of the OCG tracks created for a single object track.

Branches in the tree, shown at reference numeral 414, are created when the tracks of two or more objects merge. This occurs when the OCGM 300 is unable to uniquely identify two or more objects in the image, resulting in a single OCG track for a set of objects. When the objects are identified at some point in the future, the system links OCG tracks prior to the merge with OCG tracks after the merge. This is termed a split and merge resolution, and is described in more detail hereinafter.

A TCG track is an ordered set or sequence of nodes from the TCG 410 that represents the complete path of an object through the scene or camera view. TCG tracks are generated by performing a depth first traversal of the TCG trees on the TCG tree list 416, generating all ordered sets of TCG Nodes. In FIG. 3, there are two TCG trees that represent the tracks of three objects. The following table contains the three tracks with the set of TCG nodes and OCG tracks that form the object track.

| Objects | TCG Nodes | OCG Tracks |
|---------|-----------|------------|
| Object 1 | 4,1 | 9,6,4,1 |
| Object 2 | 4,2 | 9,8,5,2 |
| Object 2 | 3 | 3 |

The TCG tree with a root node 4 contains a merged track; OCG tracks 6 and 8 merged and formed track 9.

The inputs to the TCGM 400 are OCG tracks generated by the OCGM 300. Output of the TCGM 400 are complete tracks of objects moving through the camera field of view. The TCGM 400 calls upon the functions of an occlusion corresponder 1000 in order to manage the TCG 410. Turning to FIGS. 19–25, the operation of the TCGM 400 will be described.

TCGM/OCGM Interface

Two interface points exist between the OCGM 300 and the TCGM 400. First, the OCG forwards OCG tracks to the TCGM 400 from the OCGM 300 based on criteria described under OBJECT CORRESPONDENCE GRAPH MANAGER. Second, after the OCGM 300 has updated all tracks based on the current frame, the TCGM 400 is invoked to perform frame post processing. First, OCG track insertion is described, followed by TCGM post processing.

OCG Track Insertion

OCG Tracks that are linked to TCG tracks are processed differently than OCG tracks that are not linked to TCG tracks. The following steps are performed by the TCGM 400 when an OCG track with no TCG track links are forwarded to the TCGM 400.

1. Based on the origination of the OCG track, the TCGM must determine if this track can be linked with existing TCG tracks. The origination of the OCG track is the initial location of the object in image coordinate space. If the origination of the track is from an egress, determined by queries to the track supervisor 250, described in more detail under the heading TRACK SUPERVISOR, TRACK MANAGER, VIEW MANAGER, then it can be assumed that the OCG track represents a new object entering the scene. In this case, a new TCG track is created and the OCG track is added to the TCG track.

2. If the OCG track does not originate from an egress, then the object track originated from within the camera view. This occurs when the object is occluded, image segmentation failed to identify the object for one or more frames, all methods of correspondence failed, or erroneous tracking objects were created for some period of time by the OCGM. In this instance, the TCGM attempts to link the OCG track with existing TCG tracks. A priority is placed on the order of search and is listed below.

(a) search broken TCG tracks first
    (b) search merged TCG tracks second

In order to determine if a track can be reattached to an existing TCG track, the occlusion corresponder 1000 is invoked. The TCGM 400 invokes the occlusion corresponder with the oldest node of the OCG track with the most recent of the TCG track. The highest ranking match amongst the broken tracks is generated first. If the confidence in this match, returned for the occlusion corresponder 1000, exceeds a minimum confidence value threshold, the OCG track is added to the matching TCG track. This is done by performing the processing steps for inserting an OCG track with a TCG link. If a match is not found, the same search is performed on merged TCG tracks.

The following steps are performed by the TCGM 400 when an OCG track with a TCG track link is forwarded to the TCGM 400.

1. If the OCG Track contains two or more TCG links, a merge situation has been encountered. See the description under the heading TCG Merge Processing for a description of the merge process.

2. If the OCG Track only contains one TCG link, the TCGM 400 determines if a track split is in progress. If the TCG node referenced by the OCG track has two or more OCG track references, a split is in progress. See the description under the heading TCG Split Processing for a description of the split process.

3. If a split or merge is not encountered, the OCG track is added to the TCG Node.

With further reference to FIGS. 19–23, the process of inserting an OCG track in the TCG during a split or merge will be explained. The merge and split process is described below.

TCG Merge Processing

Figure 19:
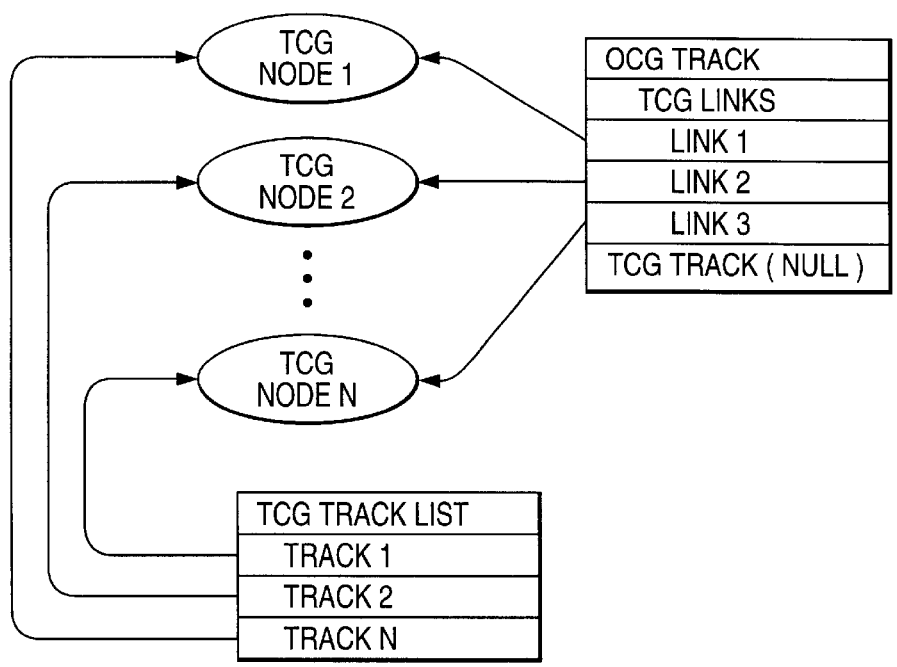
FIGS. 19–25 are graphical diagrams showing the operation of the track correspondence graph manager.
Figure 20:
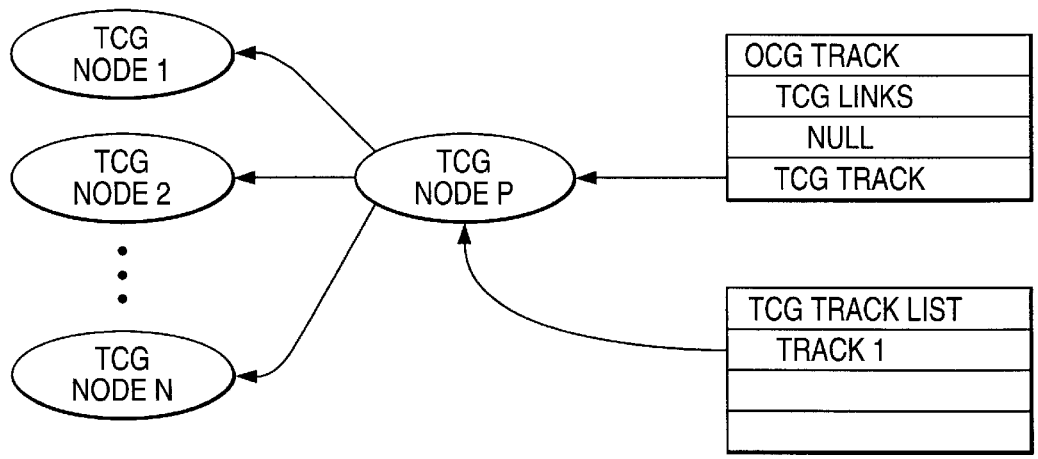

A merge creates an additional layer in the TCG and is explained with reference to FIGS. 19–20. As shown in FIG. 19, prior to the merge, the system has N independent tracks represented by TCG Node 1–TCG Node N. Each track is on the TCG track list. A single OCG track has links to each TCG Track, i.e. TCG Node 1–TCG Node N. When the OCG track is forwarded to the TCG, the TCG creates a parent node TCG Node P, that represents the merger of the N object tracks. TCG Node P has children nodes TCG Node 1–TCG Node N, which contain individual object tracks prior to the merge. The OCG track representing the merge track is added to TCG Node P. In the future, all OCG Tracks will continue to be added to TCG Node P until the composite object splits into one or more constituent objects.

TCG Split Processing

Figure 22:
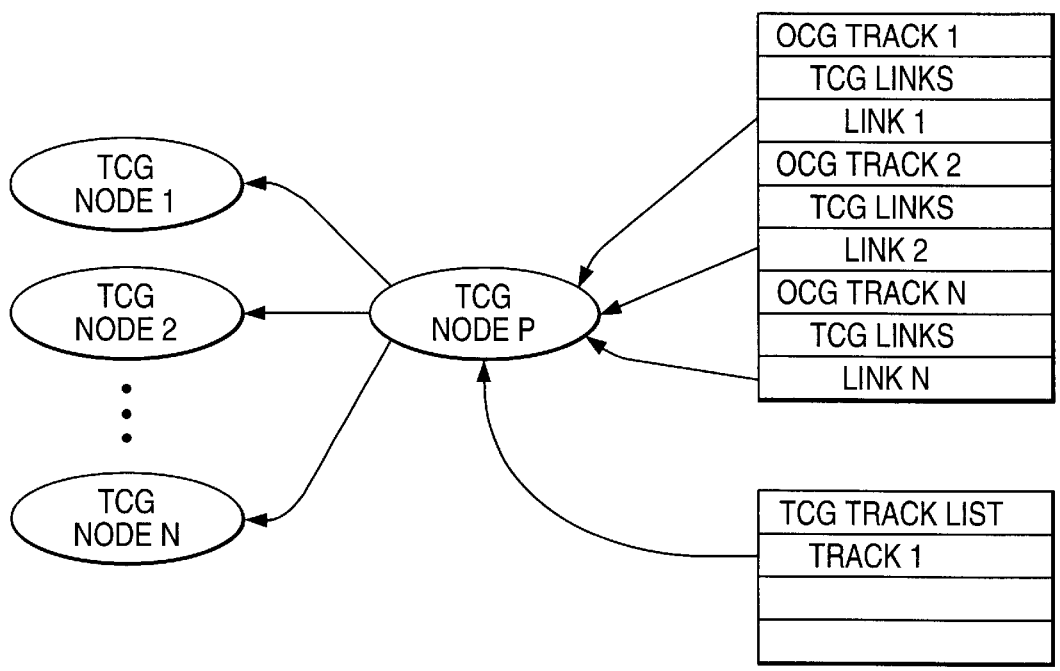
Figure 23:
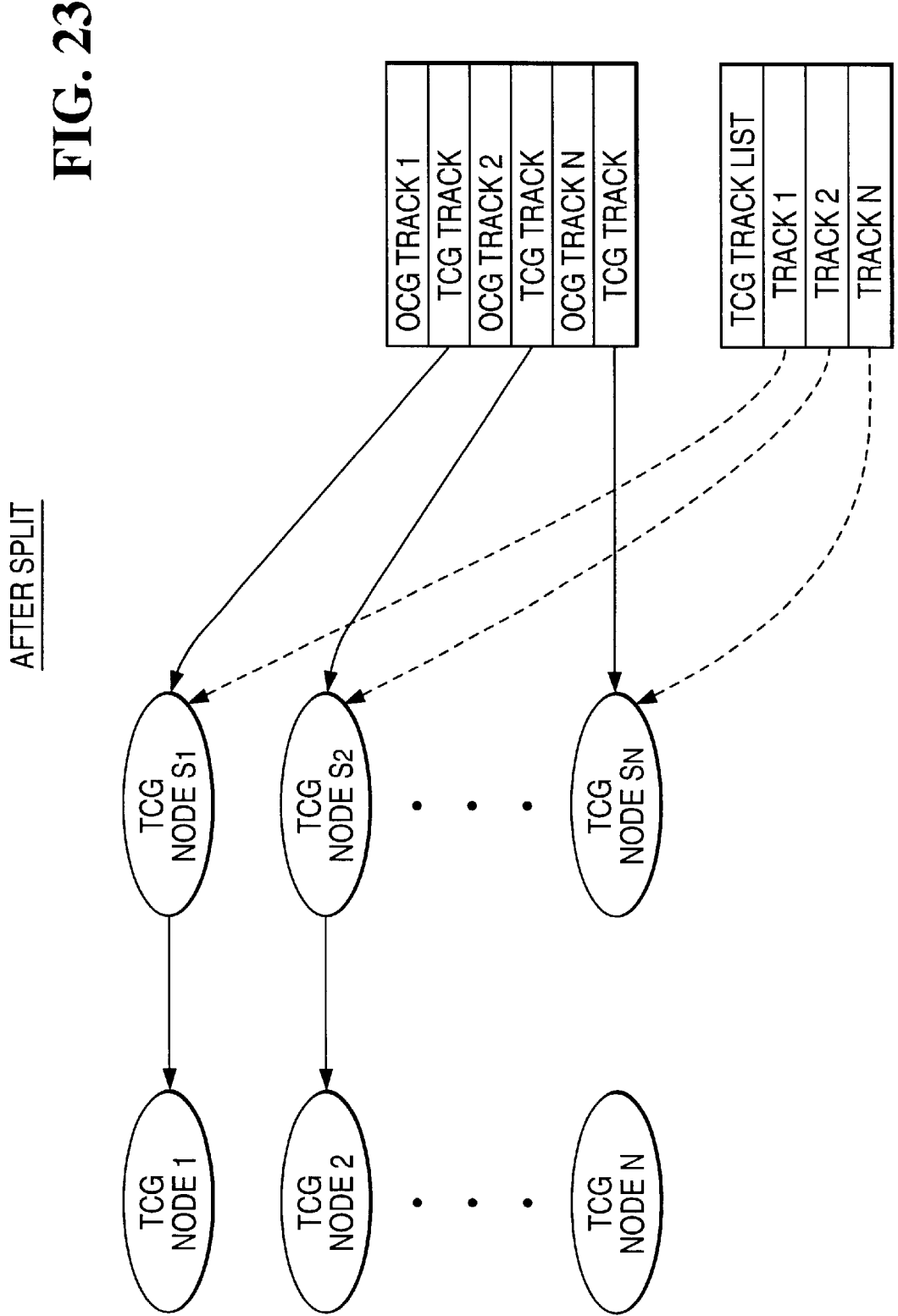

A split creates a branch in an object track, and is explained with reference to FIGS. 21–23. Prior to a split, the system has one TCG track that represents N object tracks. Each object track is found by traversing the tree formed at the root node, TCG Node P. Each object has merged, and the merge is represented by TCG Node P, where OCG tracks on Node P are the track of the merged object. At some point in the future, the object may break into N individual objects. The split operation attempts to link objects prior to the merge with those objects created after the split.

Figure 21:
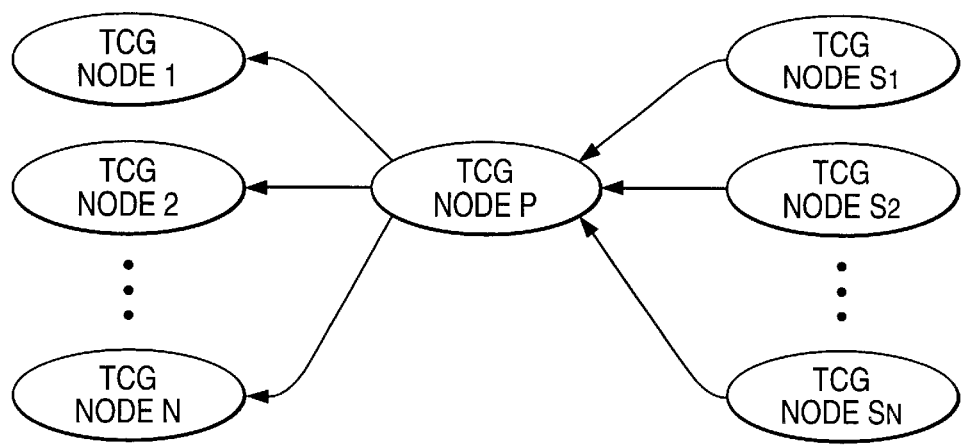

FIG. 21 illustrates a logical view of the problem. FIG. 22 illustrates the TCG prior to the forwarding of split OCG tracks. FIG. 23 illustrates the TCG after the split/merge has been resolved. When OCG tracks have been forwarded to the TCGM 400, the TCG builds a new set of nodes, S1 through SN, that represent the object tracks after the split. The TCGM 400 then determines which tracks prior to the merge and after the split correspond to the same object.

Matching TCG Nodes prior to the merge to TCG Nodes after the split is accomplished by two methods. First, if the OCGM 300 successfully tracked an object through the merge, the OCG Track forwarded to the TCG Manager contains an explicit link to the TCG Node prior to the merge. If the OCG Track does not contain an explicit link, the TCGM 400 invokes the occlusion corresponder 1000 in order to link the OCG track to the proper TCG Node. The occlusion corresponder 1000 is described in more detail hereinafter in conjunction with FIGS. 26 and 27 under the heading OCCLUSION CORRESPONDER.

In order to perform occlusion correspondence, the TCGM 400 must identify a set of region clusters on which to perform the correspondence operation. The region cluster selected after the split is a region cluster obtained from the OCG track. At this time, the oldest region cluster on the OCG track is used. Region clusters prior to the merge are selected by traversing the TCG Track tree for nodes that contain less than two children, i.e. no merge. The most recent region cluster is selected from these nodes for correspondence.

In order to select the best corresponding region cluster, the correspondence algorithm used in step 335 of the OCGM 400 is employed. This requires that the complete set of region clusters are available. In a split/merge condition, this implies that all objects have split into individual objects before the correspondence operation is performed. If more than two objects have merged and split, the system must delay the correspondence step until the last object has been recovered. This is accomplished through a TCG Node Resolution Queue. As objects split and are recovered, their tracks are added to the TCG Node Resolution Queue. When the length of the resolution queue matches the total possible number of tracks for the TCG Node Tree, correspondence is performed and the tracks are resolved by the occlusion corresponder 1000.

In some instances, objects may not be recovered. This occurs when the merged object exits the camera view, or is a result of errors in segmentation or ambiguity in the model matcher 600. In this case, the TCGM 400 forces the resolution of the merge/split when the object track is terminated.

Figure 24:
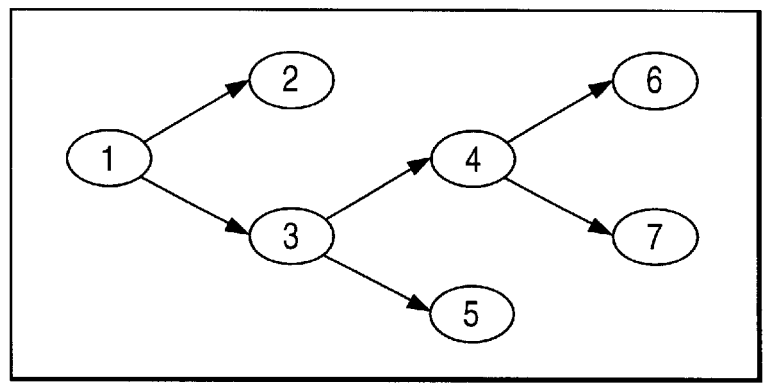
Figure 25:
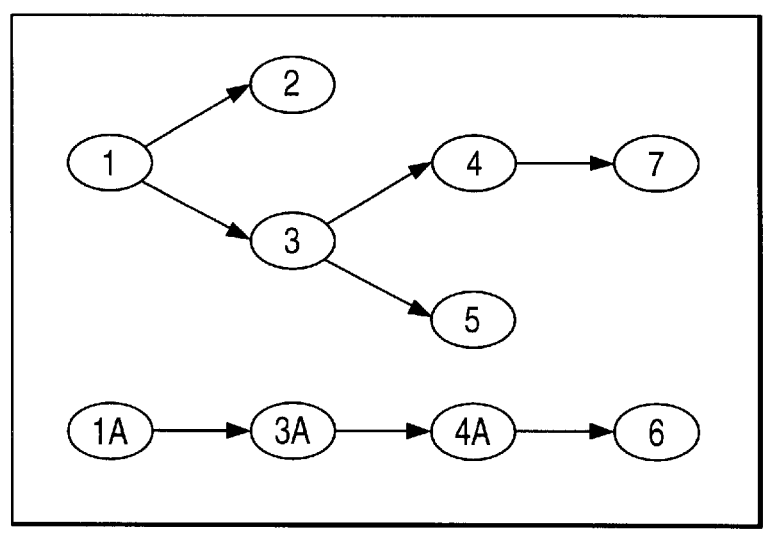

When an object track is resolved, the TCGM creates a new TCG track for the resolved object track as is explained in conjunction with FIGS. 24 and 25. Assume the track resolves to TCG Node 6 in FIG. 24. Initially, the list of TCG nodes that form the complete track is generated, the ordered set <1,2,4,6>. This path is determined by a search of the TCG track tree.

After the track is identified, the object track is removed from the current TCG track tree. Since the tracks of other objects are represented in the tree, only those nodes that contain track information for the current object are removed. In FIGS. 24 and 25, only node 6 is removed from the tree.

The final step is to create a new TCG track that represents the object track. This operation is performed by duplicating those nodes that form the complete object track. As an example, nodes 1, 3 and 4 are duplicated.

Frame Post Processing

After the OCG and TCG have been updated for the current frame, additional processing steps are performed to update the TCG. The following steps are performed.

1. TCG tracks that contain an OCG track with a BAD status are deleted.
2. TCG tracks that contain an OCG track with a DEAD status that have ended at an image location that is defined as an egress are deleted and forwarded to the track supervisor 250.
3. Dead TCG Tracks that have not been updated for greater than the Maximum TCG Dead Time are deleted from the TCG and forwarded to the track supervisor 250. This removes tracks that have ended in an area other than an egress that have a low likelihood of being attached to a future OCG track.
4. The TCGM searches the TCG for TCG Nodes that contain a merge. In some instances, the merge may be a false merge, since the two tracks may be for the same track. This typically results when the OCGM 300 generates erroneous tracks. To detect this occurrence, the TCGM searches for two TCG tracks, T1 and T2, such that
    (a) T1 is longer than T2, and
    (b) all OCG nodes in T2 share area with OCG nodes in T1

If two such TCG tracks are found on a TCG node, track T2 is deleted.

OCCLUSION CORRESPONDER

Figure 26:
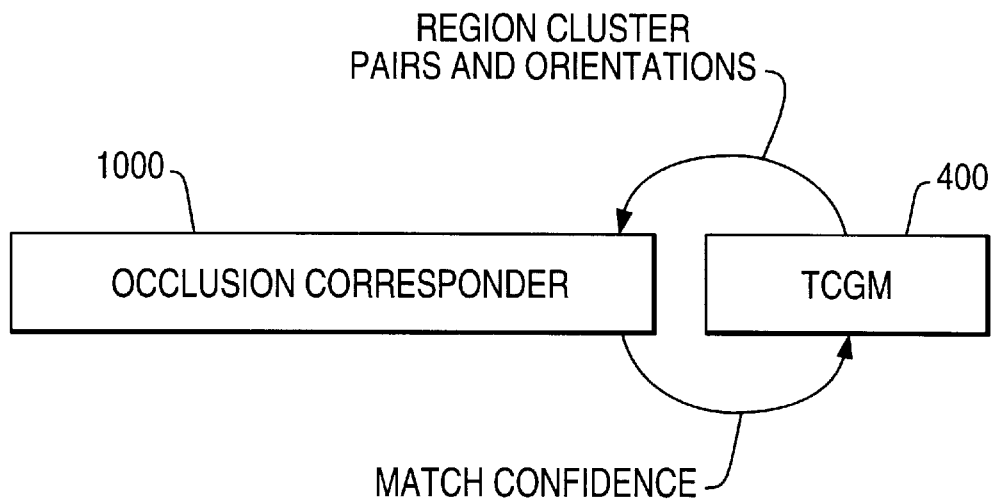
FIG. 26 is a block diagram of the occlusion corresponder forming a part of the tracking system according to the present invention.
Figure 27:
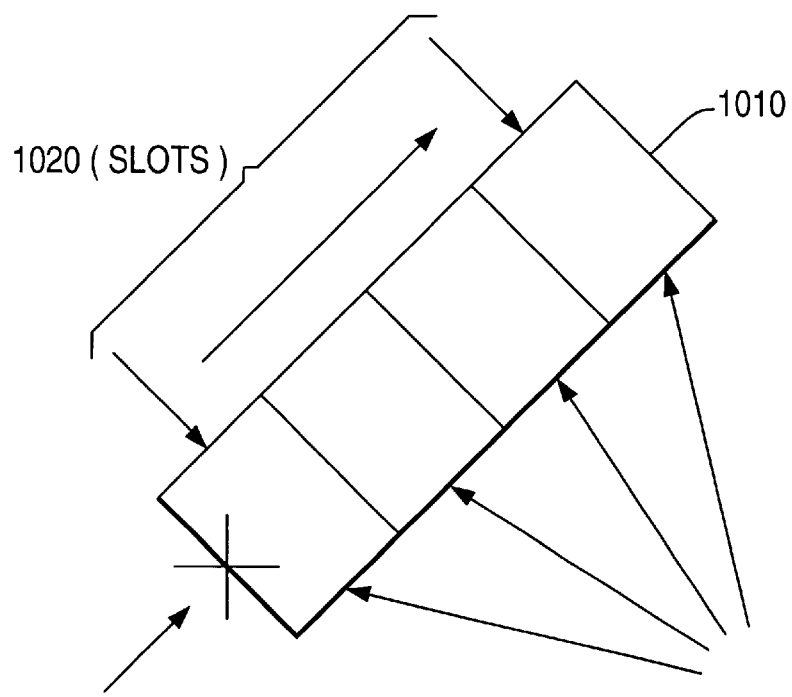
FIG. 27 is a graphical diagram showing how the occlusion corresponder generates direction color features for performing occlusion correspondence.

With reference to FIGS. 26 and 27, the occlusion corresponder 1000 is described. The occlusion corresponder 1000 is required to perform correspondence between objects, region clusters, over a long period of time. As a simple example, consider two persons $P_1$ and $P_2$ walking together through a scene. At time $t_1$ and at point A (in the image space) both of them disappear behind an object (such as a post). They reappear as persons $P'_1$ and $P'_2$ at time $t_2$ and in point B. The spatial distance between points A and B and the temporal distance $t_2-t_1$ may be too large to resolve the correspondence by the short term region corresponder. The shape features of $P_1$ and $P_2$ may be significantly changed if points A and B are far apart.

As another example, consider persons $P_1$ and $P_2$ walking together through the scene. At point A (in the image space), they become close to each other such that they are segmented as one person $P_3$. They remain merged while they move from point A to point B where they are segmented as persons $P'_1$ and $P'_2$. Similar to the first example, $P'_1$ and $P'_2$ may have significantly different shapes when compared to their original counterparts $P_1$ and $P_2$.

To resolve the correspondence for situations such as those explained in the above two examples, it is necessary to provide a correspondence algorithm that does not rely on the shape and geometrical features but uses intensity (color) features in a more comprehensive way. In order to make the most out of the color information, a process that uses color in correlation with the orientation of the object of interest (e.g., a person) is provided. This yields a descriptive feature called directional colors (DC). Compared to simpler color features such as the ones based on the global color histogram of the object, directional colors enable analysis of the color information in a number of areas along the principle axis of inertia of the object. As an example, consider a person whose top part is blue and bottom part is white. Another person whose top part is white with blue on the bottom part will have the same global color features as the first person. Therefore, using global color features it is not possible to distinguish these two people whereas the directional color featured can easily resolve such cases of correspondence.

Given a region cluster corresponding to a person, two primary pieces of information are necessary to evaluate its directional color features. First, the oriented bounding box (OBB) of the region cluster representing the object. Second, the direction of the object with respect to the its OBB. This directional information may be provided by specifying, for example, the position of the person's feet on the OBB.

With reference to FIG. 27, in order to extract the DC features, the object's OBB 1010 is partitioned into a number of analysis slots 1020. These slots are constructed along the principle axis of inertia inside the OBB 1010. The slots are indexed from 0 to N−1 where N is the number of slots inside the OBB. Typical values for N are 2 and 4. Slot 0 shares one of its edges with the bottom edge of the OBB. The bottom edge of the OBB is the edge that includes the foot position as one of its points Each of the analysis slots contains part of the object's region cluster. It is also possible to have an empty slot. This occurs if the components of a region cluster are far apart. To extract the color information the region cluster is scanned pixel by pixel to compute Y, U, and V color histograms (from a PAL color signal) inside each of the slots. These histograms are smoothed and analyzed to extract the dominant color in each of the slots. To reduce the computational complexity, the analysis is performed on three one-dimensional histograms rather than a 3-dimensional histogram. The histogram analysis involves finding the color value that maximizes the histogram function. The analysis results in a point in the YUV color coordinate system that represents the color of the slot. Performing the analysis over N slots results in N 3-dimensional points $(Y_i, U_i, V_i)$ where i ranges from 0 to N−1. These N points in the color space represent the DC features of a given object. The difference between the DC features and a global color feature scheme is significant. It is readily seen that DC features represent the color of a person by an N-entry array of points in the three dimensional color space. This is in contrast with a single color representation which yields a single point in the same color space.

There are many techniques for computing the color distance between two objects. For example, one way of measuring the correspondence between person $P_1$ and $P_2$ is to compute several distance values:

$$d_y = \frac{1}{N} \sum_{i=0}^{N-1} |Y_{1i} - Y_{2i}|$$

$$d_u = \frac{1}{N} \sum_{i=0}^{N-1} |U_{1i} - U_{2i}|$$

$$d_v = \frac{1}{N} \sum_{i=0}^{N-1} |V_{1i} - V_{2i}|$$

The overall distance is computed by taking a weighted average of the three individual distances; i.e., $d = \alpha_y d_y + \alpha_u d_u + \alpha_v d_v$,
where $\alpha_y$, $\alpha_u$, $\alpha_v$ are the weightings for each of the three color distant components.

A correspondence score is then generated based on the overall distance value.

TRACK SUPERVISOR TRACK MANAGER, VIEW MANAGER

Figure 28:
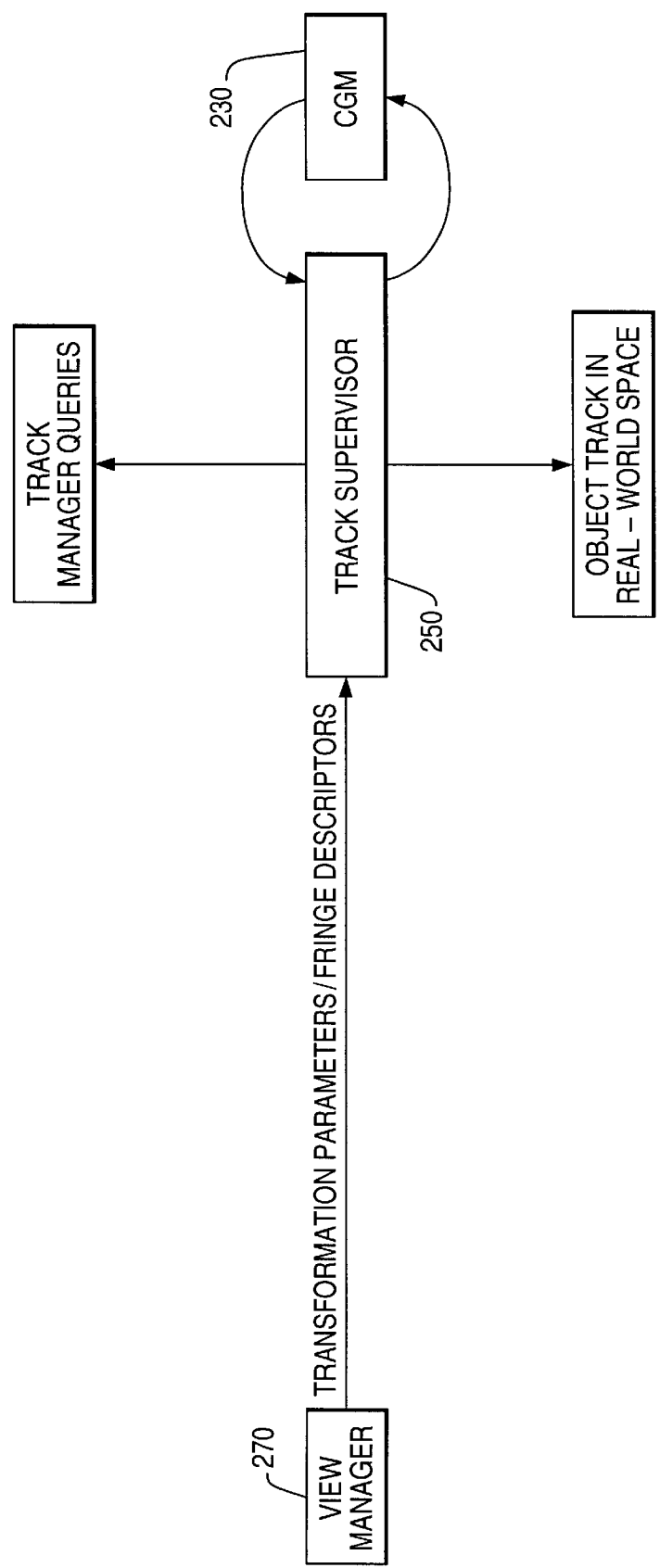
FIG. 28 is a block diagram of the track supervisor forming a part of the tracking system according to the present invention.
Figure 29:
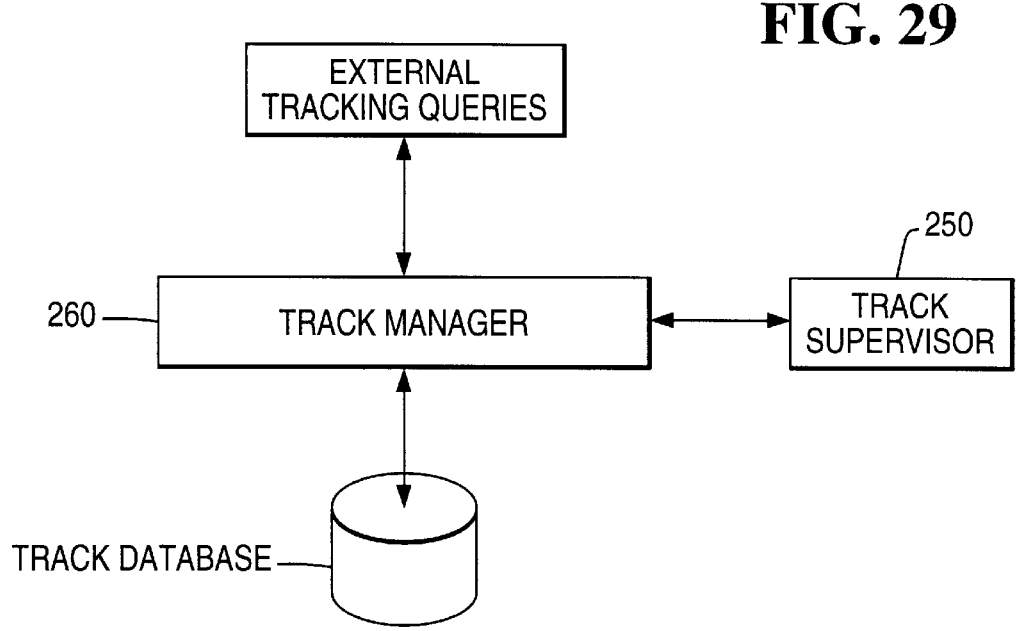
FIG. 29 is a block diagram of the track manager forming a part of the tracking system according to the present invention.
Figure 30:
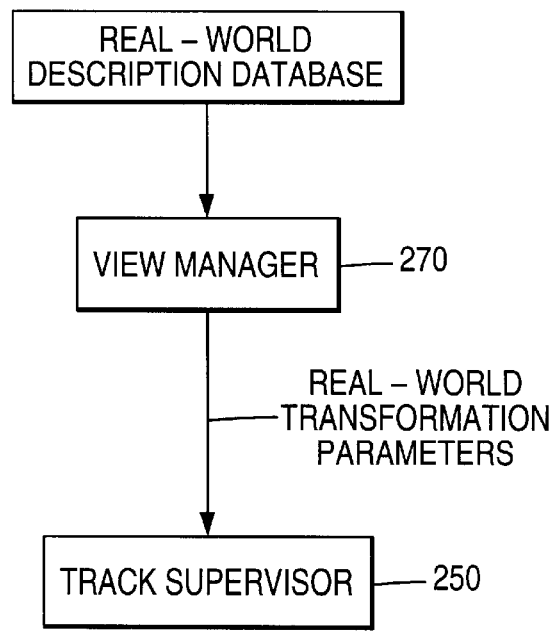
FIG. 30 is a block diagram of the view manager forming a part of the tracking system according to the present invention.

With reference to FIGS. 28–30, the track supervisor 250, track manager 260 and view manager will be described.

The track supervisor 250 provides object tracks in real-world coordinates for the view of a scene from a single camera to the track manager 260.

The track supervisor 250 receives highly likely object tracks from the TCGM 400 upon track completion. After receiving a track from the TCGM 400, the track supervisor 250 transforms the complete customer path from the image coordinate space to the real-world coordinate space prior to transferring the track to the track manager 260. This task is performed using transformation information supplied by the view manager 270.

The track supervisor 250 also processes queries from the TCGM 400 in order to determine if an object is exiting the camera view. In order to process such queries, the track supervisor 250 must have access to information describing the physical environment and the object track. Physical environment information is provided by the view manager 270 as a fringe descriptor in a real-world description database of the physical environment of the scene. The object track is provided by the TCGM 400 in the form of a TCG track. The track supervisor 250 compares the object location, in image space, to the fringe descriptor to determine if the object is in a fringe area, an egress. The track for an object that is in the fringe space can then be removed by the TCGM 400.

The track supervisor 250 manages on-line queries from the track manager 260. The track supervisor 250 obtains the current state of the tracking system from status information local to the track supervisor 250. If the query cannot be satisfied by the local information, the track supervisor 250 queries the CGM 230 for status information from the TCGM 400.

In summary, inputs to the track supervisor 250 are the real-world transformation parameters, obtained from the real-world description database, required for track transformation from image space to real-world space, description of camera entry and exit points, and complete TCG tracks. Output of the track supervisor 250 are object tracks defined in real-world coordinates, passed to the track manager 260.

The track manager 260 provides long-term storage of object tracks, as well as on-line access to current tracking information.

A track data structure consists of real-world coordinates, time stamps, and an object identifier. The track manager 260 receives the list of real-world coordinates and time stamps from the track supervisor 250, in the form of an object track. Prior to storing the object track to the track database, an object identifier is assigned to the track and the track is consolidated. Consolidation of the track is user configurable. For example, it is possible to configure the system to store an object track as a series of locations sampled at five second intervals.

The track manager 260 provides on-line access to active track information so that applications can retrieve current tracking information in real-time. For example, to support an application that monitors the number of people in a queue so that an alert can be issued when the queue length exceeds a threshold, real-time access to the number of people in a specific area is required. On-line queries are directed to the track supervisor 250 for the current state of objects and object tracks in the camera view.

The view manager 270 uses a priori information about the viewable world of an individual camera. In a single camera system architecture, the only function of the view manager 270 is to provide a priori information about camera entry and exit points, i.e. fringe areas. This information is read from the real-world description database and passed to the track supervisor 250.

USING THE TRACKING INFORMATION

The tracking system according to the present invention is suitable for many applications. One type of application is to track the movement of people through a scene, such as a retain establishment, a bank, etc. The tracking system generates information to enable the determination of movement of people through the scene, and particularly, where in the scene people are, when they were there, for how long, and where they move to from certain locations in the scene. For each object (person) in the scene, its track and a time stamp information for its path through the scene is provided. This spatial and temporal information defines the tracking information of an object, and the tracking information is accumulated for objects in the scene over time. In essence, the tracking information identifies each object and all of the places that the object has been in the scene, and the order or path through the scene.

This information is useful in designing the physical environment of an establishment. For example, the movement of customers in a store, called customer track information, is use useful in designing merchandising strategies, service locations, etc. It is also useful in designing security systems for a particular scene. This information is stored on the track database. Business establishments can use this information to determine the traffic flow in certain areas of a store, bank, etc., and how long people wait in one location, before moving on to other locations.

More specifically, the tracking system and method according to the present invention facilitates analyzing the movement of objects through a scene based on video information for video frames of the scene. Broadly stated, the method of analyzing the movement of objects comprises two steps. First, tracks of objects through the scene are constructed based upon a correspondence between regions representing objects in video frames of the scene. This first step is the tracking system and methodology described in the foregoing. The second step is the generation of tracking information based on the tracks, wherein the tracking information includes the spatial and temporal location of objects in the scene. That is, by constructing the tracks of objects, the spatial and temporal location of objects (moving) in the scene is generated. This tracking information may be analyzed or used in an infinite number of ways. The following are several examples of the utility of the tracking information.

Compare Tracking Information with Real Scene Floorplan Information

The interaction of objects in the scene with particular portions of the scene may be determined by comparing the tracking information of objects in the scene with real scene floorplan information. Specifically, the spatial information contained in the tracking information is compared with spatial or coordinate information for predetermined portions of the scene corresponding to the location of particular objects on the background of the scene. This is useful to understand what people, for example, are interacting with, waiting for, or observing in the scene. This can also be useful to count the number of customers. People objects are counted by counting the number of image regions or region clusters in the scene at a particular period of time (or over a predetermined period of time) that are determined to have a high confidence of being persons based on model information.

Generating Baseline Movement Pattern Information

The tracking information for a plurality of objects in the scene can be accumulated in order to determine basic (baseline or standard) movement behavior patterns information. This is useful to analyze the impact of a layout of floorplan on the (position and timing of) movement of people through it. Moreover, the tracking information for a particular object (person) can be compared with the basic movement pattern information to determine how far it deviates therefrom. In addition, the tracking information for a first object may be compared to the tracking information of a second object, which is also useful in determining whether the first and second objects are forming a queue. Detecting the formation of a queue is explained in more detail hereinafter.

Comparing an Object's Path with Transactions in the Scene

The tracking system is useful in comparing the path of an object, such as a person, with transactions of the object in the scene. For example, the tracking information is useful in determining the interaction of a person with a banking machine, a help desk, a particular merchandise display, etc. One example of this is the subject of commonly assigned U.S. patent application Ser. No. 09/020,322, filed Feb. 6, 1998, and entitled "Method And Apparatus For Detecting Movement Patterns At A Self-Service Checkout Terminal" and U.S. Provisional Application Ser. No. 60/037,728, filed Feb. 7, 1997 entitled "Method and Apparatus for Enhancing Security in a Self-Service Checkout Terminal," both of which are incorporated herein by reference. This is achieved by detecting an occurrence (or non-occurrence) of a transaction between an object in the scene and a particular service point in the scene. The term "service point" is meant to include, a banking machine, a particular person, or any other point in the scene where an object may perform some sort of interaction or transaction. The tracking information for the object is then correlated with the interaction. The object that is tracked may be that of a person, or a portion of a person, such as a hand and items in a hand, feet of a person, etc.

Detecting the Formation of a Queue (Line of Objects) in the Scene

The tracking information is usefull in determining when a queue (line) of objects is formed in the scene. For example, a line of customers in a retail establishment may be detected. This may be achieved by comparing tracking information for a first object with tracking information for a second object to determine whether the first and second objects are forming a queue in the scene. Other techniques of detecting when a queue is formed may be useful based on the tracking information. In addition, the number of objects in the queue may be counted.

To perform queue analysis, the following steps may be executed:

1. An area of the scene is selected. This may be indicated in real-world coordinates or image coordinates. This area corresponds to the location of the queue to be analyzed.
2. For each object track that enters within the specified area, the length of time that the track overlaps the area is calculated.
3. If the length of time exceeds a predetermined threshold, then the object is said to be in the queue.
4. The tracks of all objects in the scene can be compared for each time instance to determine the number of objects in the queue at that given time instance. This can be done in real-time, while the objects are being tracked. Alternatively, it can be executed off-line, from tracking information stored in the track database.
5. By examining the tracks, the position of objects in the queue area at a given time instance is determined. The position information for two or more tracks can be compared to extract the relative order of objects in the queue. In this case, relative order is an ordering by size of the distance of the objects to a fixed location in the queue. The distance can be extracted in real-world or image coordinates.
6. By examining the track for any object, it is also possible to determine the length of time that object has spent in the queue area. This is accomplished by counting the number of time instances on the track that the individual has spent within the queue area.

If desired, one can structure the queue by subdividing the queue area into a number of subareas called "slots". Each slot corresponds to the allowable location of an object in the queue. Only when an object spends in excess of a predefined amount of time in one of the slots is the object considered to be in the queue area.

Detecting when a Predetermined Temporal and/or Spatial Condition Occurs

The tracking information is useful to determine when a predetermined temporal and/or spatial condition occurs in the scene, and generating an indication, such as a warning signal, etc., representative thereof. The predetermined temporal and/or spatial condition may be many types of conditions, such as the entry of an object (person) into a particular portion of a scene, for example, certain "restricted" areas. Alternatively, the condition may be the passage of a hand through a scanning region of a scanner which scans items at a check-out terminal. In addition, the condition detected may be a predetermined length of a queue formed in the scene. The condition is detected by comparing the spatial information contained in the tracking information for a particular track, with spatial information corresponding to the real-world location of the area, and/or comparing the temporal information contained in the tracking information with the real-world temporal information for the particular condition.

Other Tasks

The tracking information is useful to perform other more simpler tasks, such as counting the number of objects (people) in a scene, or more complicated tasks, such as analyzing traffic flow of people, or other objects, such as automobiles, etc. through a predetermined scene. It may also be used to measure the amount of time individuals spend in observation of an area of interest, such as a promotional display, an information kiosk, ATM machine, etc. This time is called the "dwell time". Again, to determine the dwell time, the temporal and spatial information contained in the tracking information of a track is compared with the predetermined coordinate or spatial information for the particular area of interest in the scene. The total time that a track of an object spends in that particular area of interest of the scene is accumulated to determine the dwell time.

The above description is intended by way of example only and is not intended to limit the present invention in any way except as set forth in the following claims.

What is claimed is:

1. A method for tracking movement of objects in a scene from a stream of video frames, each video frame comprising image information of the scene at an instant of time, the method comprising steps of:
   (a) generating from the image information region clusters which are hypotheses of objects to be tracked in the scene, wherein multiple region clusters are generated for each object to be tracked in the scene so as to provide multiple candidates of the same object;
   (b) generating a confidence value for each region that represents a likelihood that the region cluster represents an object to be tracked, determining a correspondence between region clusters in consecutive video frames; and
   (c) constructing tracks of objects through the scene over time based upon the correspondence determined between region clusters in consecutive video frames, wherein multiple tracks are constructed for each object based on correspondence between video frames determined for each of the plurality of region clusters associated with each object to be tracked.

2. The method of claim 1, wherein the step of generating region clusters comprises periodically generating a background image representing background image information for the scene, comparing image information for a video frame with the background image to generate regions, and forming region clusters comprising one or a combination of regions based on predetermined criteria.

3. The method of claim 1, wherein the step of generating each region cluster further comprises comparing each region cluster associated with an object to be tracked with object model information which comparison is used for the purpose of generating the confidence value representing the likelihood that the region cluster represents an object to be tracked.

4. The method of claim 3, wherein the step of generating further comprise determining a correspondence of each region cluster with a region cluster in a prior video frame, and wherein the confidence value is further based on a measure of correspondence with a region cluster in the prior video frame and the likelihood that the region cluster represents an object to be tracked.

5. The method of claim 1, wherein the step of determining the correspondence comprises determining a correspondence for those region clusters determined to have at least a minimum confidence value.

6. The method of claim 1, and further comprising the step of accumulating tracking information for objects in the scene over time.

7. The method of claim 6, and further comprising determining the movements patterns of people through the scene based upon accumulated tracking information.

8. The method of claim 1, wherein the step of constructing tracks further comprises steps of:
   (d)(1) forming a first correspondence graph comprising a plurality of object nodes each representing a region cluster and a plurality of tracks, each track comprising an ordered sequence of object nodes in consecutive video frames that represents a track segment of an object in the scene; and
   (d)(2) forming a second correspondence graph comprising a plurality of nodes and a plurality of tracks, each node in the second correspondence graph corresponding to at least one track in the first correspondence graph, and each track comprising an ordered sequence of nodes in the second correspondence graph representing a track of an object through the scene.

9. A system for tracking movement of objects in a scene comprising:
   (a) a video camera positioned to monitor the scene and generate video signals representing activity within the scene;
   (b) a frame grabber coupled to the video camera to generate a stream of video frames from the video signal, each video frame comprising image information of the scene at an instant of time;
   (c) a processor coupled to the frame grabber, the processor being programmed to:
      (1) generate from the image information region clusters for a video frame which are hypotheses of objects to be tracked in the scene, wherein multiple region clusters are generated for each object to be tracked in the scene so as to provide multiple candidates of the same object;
      (2) generating a confidence value for each region that represents a likelihood that the region cluster represents an object to be tracked, determine a correspondence between region clusters in consecutive video frames; and
      (3) construct tracks of objects through the scene over time based upon the correspondence determined between region clusters in consecutive video frames, wherein multiple tracks are constructed for each object based on correspondence between video frames determined for each of the plurality of region clusters associated with each object to be tracked.

10. The system of claim 9, wherein the processor means generates a plurality of region clusters by periodically generating a background image representing background image information of the scene, comparing image information for a video frame with the background image to generate regions, and forming region clusters comprising one or a combination of regions based on predetermined criteria.

11. The system of claim 9, wherein the processor generates each region cluster by further comparing each region cluster with object model information which comparison is used for the purpose of generates the confidence value representing the likelihood that the region cluster represents an object to be tracked.

12. The system of claim 11, wherein the processor generates region clusters by further determining a correspondence of each region cluster with a region cluster in a prior video frame representing an object currently being tracked, and wherein the confidence value is further based on a measure of correspondence with a region cluster in the prior video frame and the likelihood that the region cluster represents an object to be tracked.

13. The system of claim 9, wherein the processor determines correspondence between region clusters by determining the correspondence for those region clusters determined to have at least a minimum confidence value.

14. The system of claim 9, wherein the processor is further programmed to accumulate tracking information for objects in the scene over time.

15. The system of claim 9, wherein the processor is further programmed to determine movements patterns of people through the scene based upon accumulated tracking information.

16. The system of claim 9, wherein the processor is programmed to construct tracks by:
  (i) forming a first correspondence graph comprising a plurality of object nodes representing region clusters and a plurality of tracks, each track comprising an ordered sequence of object nodes in consecutive video frames that represents a track segment of an object in the scene; and
  (ii) forming a second correspondence graph comprising a plurality of nodes and a plurality of tracks, each node in the second correspondence graph corresponding to at least one track in the first correspondence graph, and each track comprising an ordered sequence of nodes in the second correspondence graph representing a track of an object through the scene.

* * * * *